US011503341B1

(12) United States Patent
Khsib

(10) Patent No.: US 11,503,341 B1
(45) Date of Patent: Nov. 15, 2022

(54) PERCEPTUALLY MOTIVATED VIDEO PRE-FILTER

(71) Applicant: Amazon Technologies, Inc., Seattle, WA (US)

(72) Inventor: Ramzi Khsib, Surrey (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/215,624

(22) Filed: Mar. 29, 2021

(51) Int. Cl.
| | |
|---|---|
| *H04N 19/635* | (2014.01) |
| *H04N 19/625* | (2014.01) |
| *H04N 19/176* | (2014.01) |
| *H04N 21/239* | (2011.01) |

(52) U.S. Cl.
CPC ......... *H04N 19/635* (2014.11); *H04N 19/176* (2014.11); *H04N 19/625* (2014.11); *H04N 21/2393* (2013.01)

(58) Field of Classification Search
CPC . H04N 19/635; H04N 19/176; H04N 19/2393
See application file for complete search history.

(56) References Cited

U.S. PATENT DOCUMENTS

| | | | | |
|---|---|---|---|---|
| 6,766,062 B1* | 7/2004 | Donoho | ............... | H04N 19/635 382/280 |
| 6,792,129 B1* | 9/2004 | Zeng | ..................... | G06T 1/0028 382/248 |
| 10,356,404 B1* | 7/2019 | Khsib | .................... | H04N 19/14 |
| 2004/0071363 A1* | 4/2004 | Kouri | ................. | G06K 9/00516 382/128 |
| 2017/0006299 A1* | 1/2017 | Chiu | ................... | H04N 19/426 |

* cited by examiner

*Primary Examiner* — Zhubing Ren
(74) *Attorney, Agent, or Firm* — Nicholson De Vos Webster & Elliott LLP

(57) ABSTRACT

Techniques for providing perceptually motivated video pre-filtering are described. According to some embodiments, a computer-implemented method includes receiving a request at a content delivery service to encode a video, performing a discrete cosine transform (DCT) on a first pixel block of a frame of the video to generate a first DCT block, and on a second spatial pixel block of the frame, spatially offset from and overlapping with the first pixel block, to generate a second DCT block, performing a wavelet transform on the first DCT block and on the second DCT block to generate wavelet coefficients, performing a filtering on the wavelet coefficients to generate filtered wavelet coefficients, performing an inverse wavelet transform on the filtered wavelet coefficients to generate a filtered DCT block, performing an inverse discrete cosine transform on the filtered DCT block to generate a filtered pixel block, encoding the filtered pixel block to generate an encoded video, and transmitting the encoded video to a viewer device or to a storage location.

20 Claims, 16 Drawing Sheets

PERCEPTUALLY MOTIVATED VIDEO PRE-FILTER

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the following drawings.

DETAILED DESCRIPTION

Figure 1:
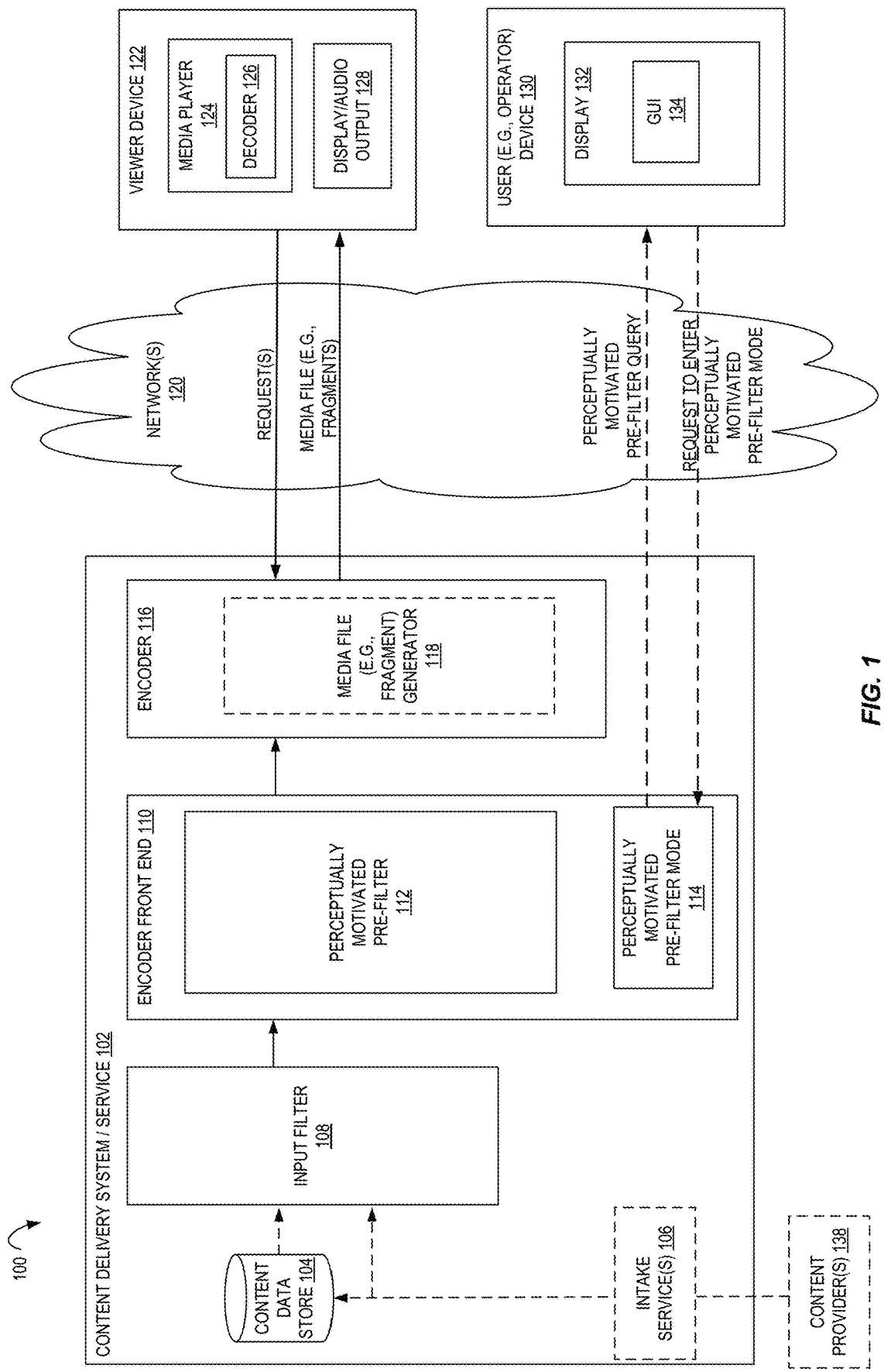
FIG. 1 is a diagram illustrating an environment including a content delivery system having a perceptually motivated pre-filter and an encoder to encode the pre-filtered media file according to some embodiments.

The present disclosure relates to methods, apparatus, systems, and non-transitory computer-readable storage media for perceptually motivated video pre-filtering for encoding of videos. In certain embodiments, a perceptually motivated pre-filter (e.g., a perceptually driven collaborative video pre-processing filter) filters input videos prior to encoding for the following objectives: (i) reduce the complexity and bandwidth once these videos are encoded, and (ii) remove any non-perceptible noise or signal. Embodiments herein are directed to a perceptually motivated pre-filter (PMPF) that uses algorithms and techniques that model a human vision system and its visual response to filter non-perceived signal(s). Application of such technique causes a substantial reduction in bit usage at a near lossless visual quality.

In certain designs, a perceptually motivated pre-filter includes one or more (e.g., any combination of) the following constraints: (i) achieves opportunistic bandwidth reduction at near visual lossless filtering, (ii) is computationally reasonable (e.g., the computation overhead should be limited), (iii) preserves the organic look, the artistic intent, e.g., film grain, color grading, etc., (iv) is resilient to motion estimation failures, scene changes, global brightness changes by embedding mechanism to revert to spatial only filtering (for example, without extra logic like a scene changes detector being required, e.g., where a scene change detector detects a scene change but the filter is to operate without it), (v) highly parallelizable/scalable to take advantage of multithreading processing resources, and/or (vi) is modular to allow (e.g., future) additions and/or changes interchangeably with newer or more sophisticated features (e.g., plug-n-play fashion to: replace block by a more advanced algorithm, add a compression artifacts reducer without change of the main logic, etc.).

In certain embodiments, a perceptually motivated pre-filter takes advantage of the human vision system characteristics and its response/sensitivity to different signal characteristics, for example, allowing frequencies that a (e.g., healthy) human eye(s) cannot see to be be removed, e.g., without altering the end visual quality. In certain embodiments, a perceptually motivated pre-filter detects a just noticeable degradation, distortion, and/or difference and tries to determine which subset of the signal (e.g., image) can be attenuated or muted without any perceptual loss.

In certain embodiments, a perceptually motivated pre-filter uses a collaborative temporal filtering framework as its filtering mechanism. For example, where a perceptual model(s) adaptively determines the filtering levels for each block (e.g., patch). In one embodiment, the collaborative filters use a combination of spatial blocks (e.g., frames) and temporal blocks (e.g., frames) as support to filter a particular block (e.g., frame) (e.g., the "current block to be filtered").

In certain embodiments, the workflow of a PMPF filtering mechanism (e.g., "core filtering") presumes that any noise (e.g., camera noise, high sensitivity to light (e.g., International Organization for Standardization (ISO)) noise, digital noise, compression artifacts, etc.) is considered random, so that a current block to be filtered will have multiple spatial and temporal representations (e.g., blocks that share similarities). Assuming noise is random and of high frequency nature, the collaborative filtering will try to determine the common frequencies between all these blocks and filter/attenuate the variable high frequencies among all the representations of current block in certain embodiments. In certain embodiments, the PMPF filtering flow is to group spatial and temporal blocks that constitute a slightly different (e.g., less than a threshold difference) representation of the current block into an (e.g., three-dimensional) array. In one embodiment, this array will be reshaped to group same frequency sub-bands into a stack (e.g., if the discrete cosign transform (DCT) is used, group by index inside the (e.g., 8×8) DCT coefficients). In certain embodiments, each vector of the stack will be forward transformed using a discrete wavelet transform, e.g., a one-dimensional Haar transform. Certain embodiments perform wavelet coefficient thresholding (e.g., shrinkage) to cause filtering of the vector of sub-bands. For example, with the inverse wavelet transform applied followed by an inverse DCT to reconstruct the filtered block (e.g., image). In one embodiment, an input image is decomposed into sliding local blocks (e.g., patches) with an overlap smaller than the block size (e.g., an 8 pixel by 8 pixel block). In one embodiment, the workflow of a PMPF filtering mechanism on each patch (e.g., where a patch is a block of the same size as the chosen transform size) is: (i) perceptual motivated thresholds computation, (ii) using motion estimation, gather spatiotemporal representations of the current block to be filtered "CBF", (iii) perform perceptual motivated wavelet shrinkage, (iv) perform reconstruction and aggregation, (v) perform post processing, and/or (vi) perform final image generation.

FIG. 1 is a diagram illustrating an environment 100 including a content delivery system 102 (or service) having a perceptually motivated pre-filter 112 and an encoder 116 to encode the pre-filtered media file according to some embodiments. In certain embodiments, perceptually motivated pre-filter 112 is used to filter input videos prior to encoding for the following objectives: (i) reduce the complexity and bandwidth once these videos are encoded, and (ii) remove any non-perceptible noise or signal. As content delivery system/service 102 may be utilized for live (e.g., and video-on-demand) application, the computation overhead of the perceptually motivated pre-filter 112 is to be limited compared to the computation used by the entire encoding pipeline (e.g., encoder 116) to make it usable by a user (e.g., end user) in certain embodiments.

The depicted content delivery system/service 102 includes a content data store 104, which may be implemented in one or more data centers. In one embodiment, the media file (e.g., video file that is to be viewed by the viewer device 122) is accessed (for example, from the content data store 104 or directly from a content provider 138, e.g., as a live stream) by encoder 116 (e.g., by media file (e.g., fragment) generator 118). In certain embodiments, an intake service 106 is included to intake a video from content provider(s) 138. In certain embodiments, the (e.g., client) viewer device 122 requesting the media file (e.g., fragment(s)) of media) from content delivery system/service 102 causes the encoder 116 to encode the video file, e.g., into a compressed format for transmittal on network(s) 120 to viewer device 122. In one embodiment, the media file generator 118 generates one or more subsets (e.g., frames, fragments, segments, scenes, etc.) of the media file (e.g., video), e.g., beginning with accessing the media file and generating the requested media (e.g., fragment(s)). In one embodiment, each fragment includes a plurality of video frames.

It may be desirable to filter input videos (e.g., one or more frames thereof) prior to encoding, e.g., to cause a substantial bit usage reduction at a lossless (or a near/substantially lossless) visual quality. Content delivery system/service 102 includes perceptually motivated pre-filter 112. In FIG. 1, content delivery system/service 102 is coupled to viewer device 122 and user device 130 via one or more networks 120, e.g., a cellular data network or a wired or wireless local area network (WLAN).

In certain embodiments, content delivery system/service 102 (e.g., perceptually motivated pre-filter 112 thereof) is to send a query (e.g., asking if perceptually motivated pre-filter mode 114 is desired) to user (e.g., operator) device 130, for example, and the user device 130 (e.g., in response to a command from a user of the device 130) is to send a response (e.g., an indication to enter or not enter perceptually motivated pre-filter mode 114). Depicted user device 130 includes a display 132 having a graphical user interface (GUI) 134, e.g., to display a query for perceptually motivated pre-filter 112 to enter (or not) perceptually motivated pre-filter mode 114. The content delivery system/service 102 may include an input filter 108, e.g., to perform a rescaling (e.g., downscaling) of the video (e.g., from a first resolution to a second, different resolution).

In certain embodiments, content delivery system/service 102 includes an encoder front end 110, e.g., as the pre-analysis stage of an encoding. In certain embodiments, encoder front end 110 extracts one or more features (e.g., statistics) from the input video, e.g., on a per scene, per GOP, per frame, per block, etc., of granularity. Perceptually motivated pre-filter 112 may be included within encoder front end 110 (or other component of environment 100).

Figure 2:
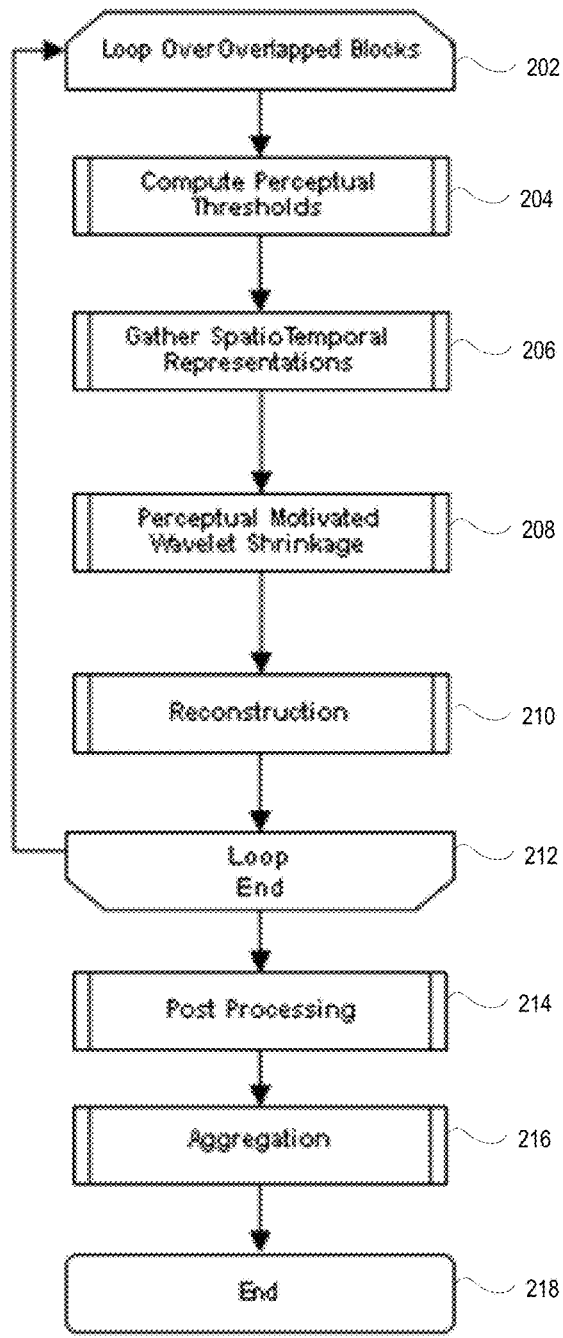
FIG. 2 is a flow diagram illustrating operations of a method for perceptually motivated pre-filtering according to some embodiments.

Depicted viewer device 122 (e.g., where the viewer is a customer of user (e.g., operator) of device 130) includes a media player 124 having a decoder 126 to decode the media file (e.g., fragment) from the content delivery system/service 102, e.g., to display video and/or audio of the media file on display and/or audio output 128, respectively. Turning now to FIG. 2, embodiments of filtering a media file (e.g., video) with a perceptually motivated pre-filter (e.g., perceptually motivated pre-filter 112) are described.

FIG. 2 is a flow diagram illustrating operations 200 of a method for perceptually motivated pre-filtering according to some embodiments. In certain embodiments, operations 200 are performed on one or more blocks (e.g., a plurality of blocks that are spatially offset from and overlapping with each other). In certain embodiments, a frame (e.g., each frame, which may be referred to as the current frame to be filtered ("CFF")) of a video that is to be filtered by operations 200 is received. In certain embodiments, that frame is divided into a plurality of blocks, e.g., current block to be filtered ("CBF"). For example, a single frame may be formed from about 100 blocks that overlap or do not overlap.

In certain embodiments, operations 200 include beginning a loop at 202 over overlapped blocks. In certain embodiments, operations 200 include computing perceptual thresholds at 204, for example, as discussed in further detail below.

In certain embodiments, operations 200 include gathering spatiotemporal representations at 206, for example, as discussed in further detail below. Spatiotemporal representations may include (i) spatial block(s) (e.g., block(s) that are spatially offset within the same frame (e.g., the CFF)) and/or (ii) temporal block(s) (e.g., block(s) that are temporally offset by at least one frame from that frame (e.g., offset from the CFF), e.g., but not spatially offset). In certain embodiments, the spatiotemporal representations and perceptual thresholds are used to perform a (e.g., perceptually motivated) wavelet shrinkage at 208 for example, as discussed in further detail below.

In certain embodiments, the PMPF filtering flow is to group spatial and temporal blocks that constitute a slightly different (e.g., less than a threshold difference) representation of the current block into an (e.g., three-dimensional) array. In one embodiment, this array will be reshaped to group same frequency sub-bands into a stack, e.g., if the discrete cosign transform (DCT) is used, group by index inside the (e.g., 8×8) DCT coefficients. In certain embodiments, each vector of the stack will be forward transformed using a discrete wavelet transform, e.g., a one-dimensional Haar transform. Certain embodiments perform wavelet coefficient thresholding (e.g., shrinkage at 208) to cause filtering of the vector of sub-bands. For example, with the inverse wavelet transform applied followed by an inverse DCT to reconstruct the filtered block (e.g., image).

In certain embodiments, 204, 206, and 208 are repeated for each (e.g., spatial and/or temporal) block (e.g., frame). In one embodiment, there is a current block ("CBF") to be filtered, and one or more spatial and/or temporal blocks that are each processed according to 204, 206, and 208.

Once each loop is completed, e.g., until loop end at 212, then (optional) post processing is performed at 214, for example, as discussed in further detail below. In certain embodiments, the current block ("CBF") to be filtered and one or more spatial blocks and/or temporal blocks are aggregated to form a block and the end of the filtering flow is reached at 218, e.g., with that block being used in encode (e.g., as input to encoder 116 in FIG. 1), for example, as discussed in further detail below.

Overlapped DCT Transform: Transform Size and Overlap Size Consideration

In certain embodiments, an overlapped transform (e.g., DCT) is defined by the size of the transform (e.g., DCT) and the overlap size (e.g., the number of pixels that overlap). For a balanced trade-off between computation and quality and from the empirical data gathered the size of the transform is set to a particular value for the filtering. In one embodiment, the overlap is eight pixels, although any other overlap may be used.

In one embodiment, the overlap size defines the distance in pixels between the top left corners between the 2 consecutive (e.g., transform) blocks. In one embodiment, an overlapped transform uses single pixel overlap. However, e.g., where this may not be practically implemented owing to computing resources, etc. The number of (e.g., DCT) transforms are equal to the width times the height in certain embodiments. As shown in Table 1 below, a single (i.e., one) pixel overlap will generate an image for each position inside an 8 pixel×8 pixel block (for example, where each frame is formed from a plurality of blocks, e.g., 100s of blocks). Thus, the total number of images (e.g., frames) to be aggregated, for certain embodiments of an 8×8 transform size to get the final (e.g., frame) is 64 images (e.g., frames). However, in certain embodiments less of an overlap is desirable, e.g., an overlap of four pixels is a reasonable trade-off between computation overhead and desired quality in one embodiment.

TABLE 1

Example Overlap Sizes

| Overlap Size | Number of (e.g, DCT) Transforms | Number of Images (e.g., Frames) Generated |
|---|---|---|
| 1 | Width × Height | 64 |
| 2 | (Width/8 × Height/8) × 16 | 16 |
| 4 | (Width/8 × Height/8) × 4 | 4 |

Another combination of transform DCT size and overlap using the same number of computations is DCT 16 pixel×16 pixel block with an overlap of four. The downsides with the later combinations are that, in some embodiments, this requires to store 16 filtered images and aggregate all these images to generate the final image, e.g., extra memory and computation, and certain perceptual models (e.g., contrast sensitivity function (CSF)), a contrast masking (CM) model, or a luminance adaptation (LA) model) are designed to work on a certain sized (e.g., 8×8) block of pixels.

Figure 3:
FIG. 3 is a diagram illustrating overlap positions for an overlap of four pixels according to some embodiments.

FIG. 3 is a diagram 300 illustrating overlap positions for an overlap of four pixels according to some embodiments. In certain embodiments, with an overlap of four pixels for an image (e.g., frame), four images will be generated representing the four possible overlaps inside an 8×8 block: e.g., indexed at pixels [(0,0), (0,4), (4,0), (4,4)]. In certain embodiments, these four images will be aggregated to get the final image on-the-fly to obtain lower bias and thus overfit on the video at hand. In one embodiment, the first image begins at pixel index (0,0), a second (e.g., spatially offset) image begins at pixel index (0,4), a third (e.g., spatially offset) image begins at pixel index (4,0), and a fourth (e.g., spatially offset) image begins at pixel index (4,4). Note that each of the images may be divided into a plurality of blocks for processing, e.g., a transform, on each block. For example, where the first image beginning at pixel index (0,0) includes a first 8×8 block at indices [(0,0) to (8,8)], a second block at indices [(8,0) to (16,8)], a third block at indices [(0,8) to (8,16)], etc. For example, where the second (e.g., spatially offset by four horizontal pixels) image beginning at pixel index (4,0) includes a first 8×8 block at indices [(4,0) to (12,8)], a second block at indices [(12,0) to (20,8)], a third block at indices [(4,8) to (12,16)], etc. For example, where the third (e.g., spatially offset by four vertical pixels) image beginning at pixel index (0,4) includes a first 8×8 block at indices [(0,4) to (8,12)], a second block at indices [(0,12) to (8,20)], a third block at indices [(8,4) to (16,12)], etc. For example, where the fourth (e.g., spatially offset by four horizontal pixels and four vertical pixels) image beginning at pixel index (4,4) includes a first 8×8 block at indices [(4,4) to (12,12)], a second block at indices [(12,4) to (20,12)], a third block at indices [(4,12) to (12,20)], etc. In certain embodiments, the overlap size is utilized to determine the spatial representations, e.g., at 206 in FIG. 2.

Perceptual Motivated Thresholds Computation

In certain embodiments, perceptual thresholds are derived from a spatiotemporal just noticeable difference (JND) model that combines spatial human vision system characteristics and a temporal masking model.

In one embodiment, the motion masking model involves: (i) a temporal contrast sensitivity function (or frequencies cannot be perceived beyond certain velocity), (ii) motion attention model (or tracking object will prevent perception of distortions in the background), and (iii) foveated vision, e.g., anything that falls outside the eye fovea will have reduced spatial resolution.

In one embodiment, the perceptual thresholds are temporal JND thresholds, e.g., where the temporal JND is chosen to follow a multiplicative model where the Final Temporal JND is:

$$\text{JNDThreshold}(x,y) = \text{FilterStrength} * \text{CSF}(x,y) * \text{LA}(x,y) * \text{CM}(x,y) \quad (1)$$

In certain embodiments, the spatiotemporal JND model is utilized to determine the perceptual (e.g., JND) thresholds, e.g., at 204 in FIG. 2.

Gather Spatio-Temporal Representations of the Current Block to be Filtered "CBF"

In certain embodiments, a transform is a discrete wavelet transform (e.g., alternatively or additionally to performing a DCT, as discussed herein) and the decomposition level will dictate the number of spatiotemporal representations for the CBF (for example, where the term representation is used to indicate a spatial or temporal block for the current block, e.g., a spatial or temporal block that is similar to the current block).

In certain embodiments, a wavelet is a wave-like oscillation with an amplitude that begins at zero, increases, and then decreases back to zero. In certain embodiments, a wavelet transform is a transformation that allow only changes in time extension, but not shape. In certain embodiments, a discrete wavelet transform decomposes a signal into a mutually orthogonal set of wavelets. For instance, if Haar-1D is selected as the discrete wavelet transform with three levels of decomposition, this imposes that the number of blocks to be used is 8 thus 7 representations of the current block to be fileted "CBF" in one embodiment.

In certain embodiments, optimal filter results are obtained with a higher number of temporal blocks (e.g., more representations for the same CBF and the filter is to remove the random part that varies). If Haar-1D is selected with 3 levels of decomposition, 7 temporal blocks will be needed in certain embodiments, e.g., where the 7 temporal blocks impose that for the current image to be filtered, 7 motion compensated images are available. However, in certain instances this may be a non-desirable solution for the computation burden and increased delay.

As a solution, certain embodiments herein use spatial blocks (e.g., starting at (0,4), (4,0) and (4,4) as discussed in reference to FIG. 3). In certain embodiments, the benefits to doing so are no need for motion estimation and compensation for 3 frames (e.g., only perform this on 4 of 7 additional frames) and/or no need to compute DCT for these representations, e.g., from the spatial part, the DCT coefficients are readily available so reuse them to save in terms of computations (e.g., 3 forward DCTs per 8×8 block).

In certain embodiments, a wavelet transform is utilized to perform a wavelet shrinkage (e.g., according to the perceptual (e.g., JND) thresholds), e.g., at 208 in FIG. 2.

Figure 4:
FIG. 4 is a diagram illustrating a current block to be filtered, three spatial blocks, and four temporal blocks according to some embodiments.

FIG. 4 is a diagram illustrating a current block (e.g., of a frame) to be filtered 402, three spatial blocks 403, 405, and 407, and four temporal blocks 409, 411, 413, and 415 according to some embodiments. In one embodiment, these eight blocks (e.g., eight frames) are used for a wavelet transform (e.g., Haar-1D with 3 level of decomposition) are the current block (e.g., frame) to be filtered 402, three spatial blocks (e.g., frames) 403, 405, and 407 (indexed at (0,4), (4,0) and (4,4), respectively), and four temporal blocks (e.g., frames) 409, 411, 413, and 415, for example, temporally offset by one or more frames in forward or reverse video order, e.g., having a delta index of one frame previous to the current frame being filtered (i.e., "−1"), having a delta index of one frame after the current frame being filtered (i.e., "1"), having a delta index of two frames previous to the current frame being filtered (i.e., "−2"), and having a delta index of two frames after the current frame being filtered (i.e., "2") (e.g., but not spatially offset from the current frame being filtered).

Figure 5:
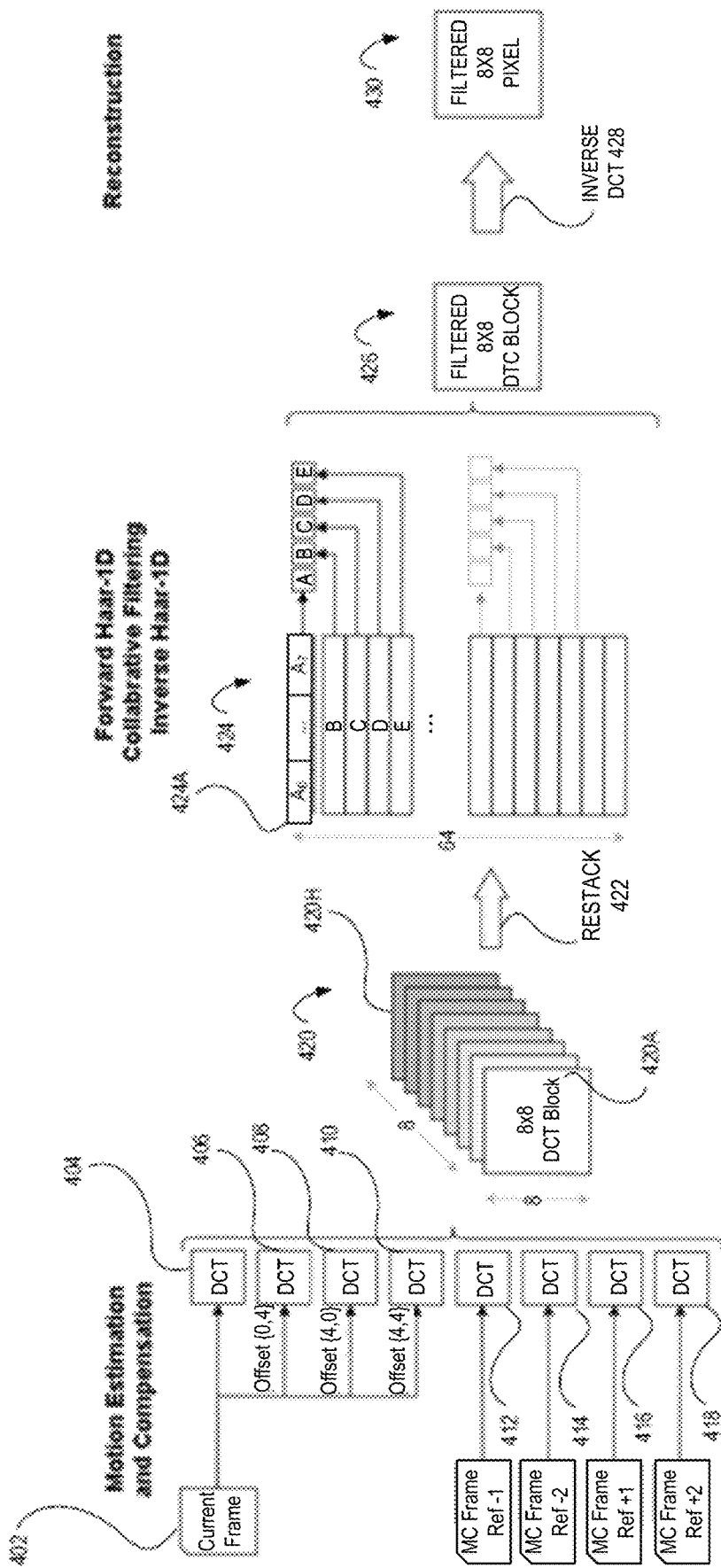
FIG. 5 is a flow diagram illustrating (i) motion estimation and compensation, (ii) forward wavelet transform, collaborative filtering, and inverse wavelet transform, and (iii) reconstruction in a method for perceptually motivated pre-filtering according to some embodiments.

FIG. 5 is a flow diagram illustrating (i) motion estimation and compensation, (ii) forward wavelet transform, collaborative filtering, and inverse wavelet transform, and (iii) reconstruction in a method for perceptually motivated pre-filtering according to some embodiments. In certain embodiments, a current block (e.g., frame) to be filtered 402 is received, and the three spatial blocks (e.g., frames) 403, 405, and 407 (indexed at (0,4), (4,0) and (4,4), respectively) and four temporal (e.g., motion compensated (MC)) blocks (e.g., frames) 409, 411, 413, and 415 are determined (for example, the spatiotemporal representations, e.g., at 206 in FIG. 2).

In certain embodiments, a DCT is performed on each of those blocks of pixels (e.g., cumulatively forming a frame), for example, with DCT 404 performed on block (e.g., frame) 402 generating a respective DCT block (e.g., a respective DCT block for each block of that single frame), DCT 406 performed on block (e.g., frame) 403 generating a respective DCT block (e.g., a respective DCT block for each block of that single frame), DCT 408 performed on block (e.g., frame) 405 generating a respective DCT block (e.g., a respective DCT block for each block of that single frame), DCT 410 performed on block (e.g., frame) 407 generating a respective DCT block (e.g., a respective DCT block for each block of that single frame), DCT 412 performed on block (e.g., frame) 409 generating a respective DCT block (e.g., a respective DCT block for each block of that single frame), DCT 414 performed on block (e.g., frame) 411 generating a respective DCT block (e.g., a respective DCT block for each block of that single frame), DCT 416 performed on block (e.g., frame) 413 generating a respective DCT block (e.g., a respective DCT block for each block of that single frame), and DCT 418 performed on block (e.g., frame) 415 generating a respective DCT block (e.g., a respective DCT block for each block of that single frame), these DCT blocks may be referred to cumulatively as DCT blocks 420.

In one embodiment, starting at the first block (e.g., indexed from (0,0) to (8,8) in frame 402), a first 8×8 block of DCT coefficients 420A is generated for frame 402, a second 8×8 block of DCT coefficients 420B is generated for frame 403, a third 8×8 block of DCT coefficients 420C is generated for frame 405, a fourth 8×8 block of DCT coefficients 420D is generated for frame 407, a fifth 8×8 block of DCT coefficients 420E is generated for frame 409, a sixth 8×8 block of DCT coefficients 420F is generated for frame 411, a seventh 8×8 block of DCT coefficients 420G is generated for frame 413, and an eight 8×8 block of DCT coefficients 420H is generated for frame 415.

In certain embodiments, these DCT coefficients in the three-dimensional form (e.g., as shown at 420) are restacked at 422 into a plurality of vectors 424, for example, with each coefficient from a same location in each block of 420 moved into an element in a single vector, e.g., DCT coefficient from index (0,0) in each of DCT blocks A-H used to form single vector 424A, etc. for the rest of the coefficient indices.

In certain embodiments, a wavelet transform is performed on each of the plurality of vectors 424 (e.g., with the results of each transform on a vector being independent of the other vectors), for example, and then a filtering (e.g., shrinkage) performed on the results on those transforms to generate corresponding filtered DCT block 426, e.g., after an inverse wavelet transform.

In certain embodiments, an inverse DCT 428 is performed on filtered DCT block 426 to generate a filtered (e.g., 8×8) pixel block 430. In certain embodiments, the filtered pixel blocks are aggregated into a single pixel block (e.g., frame), which may then be encoded.

Figure 6:
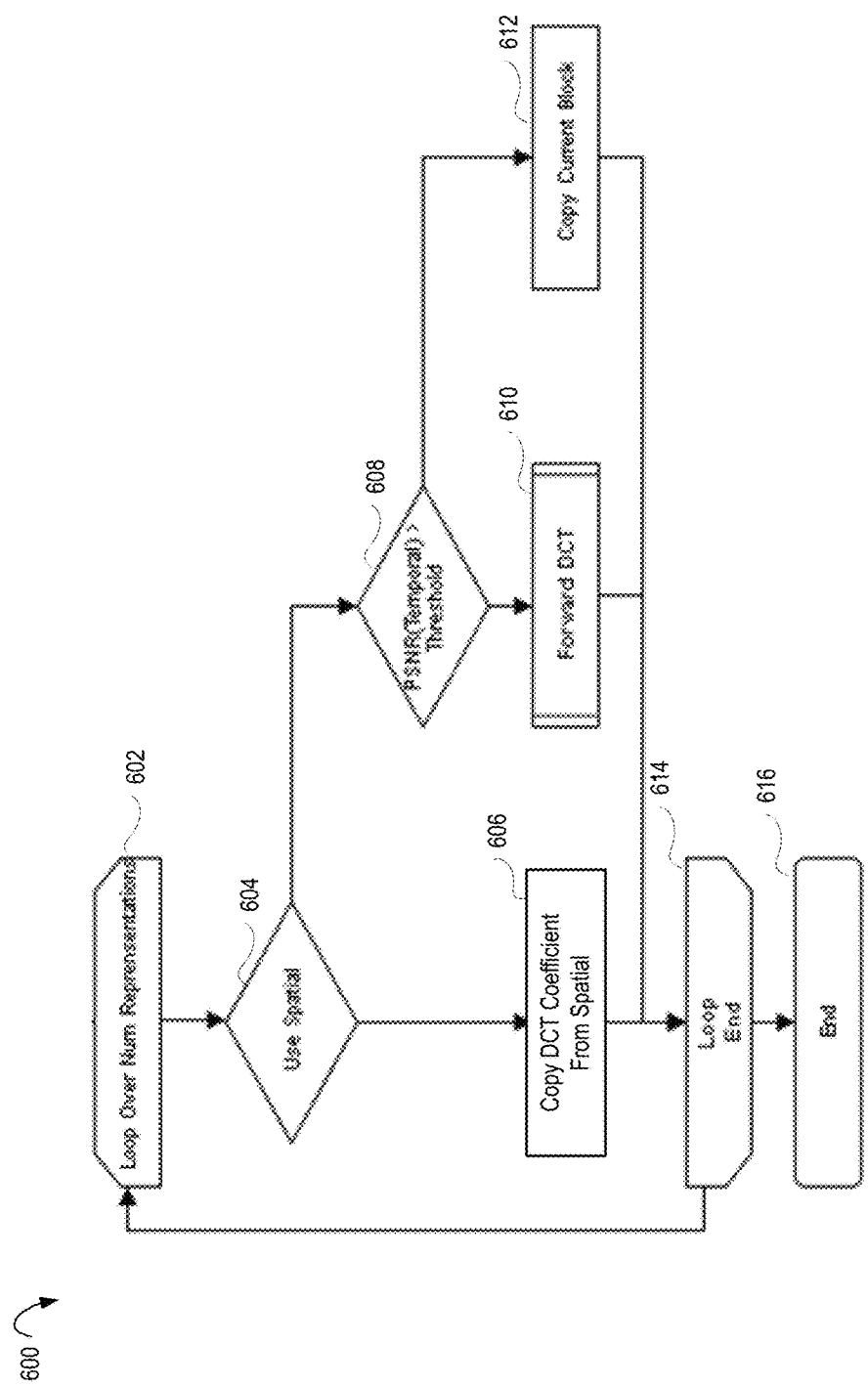
FIG. 6 is a flow diagram illustrating gathering spatiotemporal representations in a method for perceptually motivated pre-filtering according to some embodiments.

FIG. 6 is a flow 600 diagram illustrating gathering spatiotemporal representations in a method for perceptually motivated pre-filtering according to some embodiments. In order to prevent the PMPF from any potential motion estimation failures and ensure that there is minimum similarity between the CBF and any of its temporal representations, a similarity index is defined in certain embodiments. In one embodiment, whenever a temporal block is deemed as a "non-similar" block to a CBF, the CBF is instead copied over (e.g., removing the temporal block) from that set of 8 blocks (e.g., as shown in FIG. 4, removing one or more of blocks 409, 411, 413, and 415). This will ensure that in certain embodiments, the filter is resilient to motion estimate failures due to a scene change, fade-ins, global brightness change, etc. In certain embodiments, it will also implicitly revert to a pseudo spatial filtering (e.g., pseudo because the spatial overlap with positions (0,4), (4,0) and (4,4) but the filtering technique is slightly different).

In FIG. 6, depicted flow 600 is to loop at 602 over the number of temporal representations (e.g., four in the embodiment shown in FIG. 4). In certain embodiments, when there is not a sufficient processing budget (e.g., time) for a (e.g., single or multiple) frame delay to obtain temporal blocks (e.g., frame(s)), it may be decided to use only spatial frame(s) at 604, e.g., without changing the number of blocks (e.g., the four temporal blocks 409, 411, 413, and 415 of the eight blocks in FIG. 4) input for each current block to be filtered. In one embodiment, a user selects between a mode that does not use temporal blocks (e.g., frame(s)) and a mode that uses temporal blocks (e.g., frame(s)). In one embodiment, when in a mode that does not use temporal blocks (e.g., frame(s)), the PMPF method/system is to copy the DCT coefficient(s) of the current frame being filtered instead of waiting for a temporal frame, for example, at 606, using the DCT coefficients for block 402 as the DCT coefficients for blocks 409, 411, 413, and 415 in FIG. 4. In one embodiment, when in a mode that does use temporal blocks (e.g., frame(s)), PMPF method/system is to, at 608, check if a peak signal-to-noise ratio (PSNR) for a temporal block exceeds a threshold (e.g., indicating the temporal block is in a different scene than the current block to be filtered), and when the PSNR exceeds the threshold, at 612, copies block 402 to use as one or more of blocks 409, 411, 413, or 415, and when the PSNR does not exceed the threshold (e.g., indicating the temporal block is in a same scene with the current block to be filtered), perform a forward DCT on that temporal block at 610. Once the representations have been looped through, the loop ends at 614, e.g., and the gathering of spatiotemporal representations ends at 616.

Perceptual Motivated Wavelet Shrinkage

Figure 7:
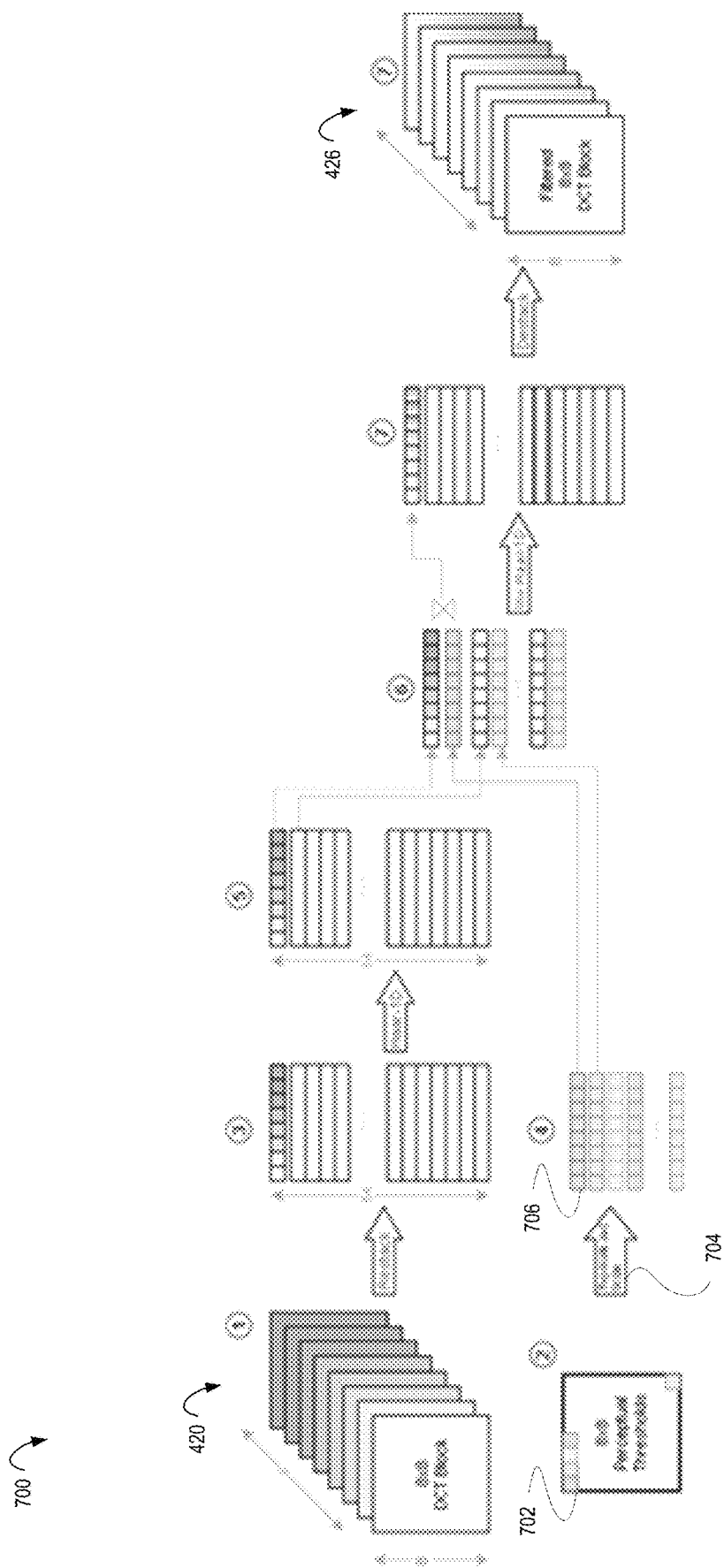
FIG. 7 is a flow diagram illustrating perceptual wavelet shrinkage in a method for perceptually motivated pre-filtering according to some embodiments.

FIG. 7 is a flow 700 diagram illustrating perceptual wavelet shrinkage in a method for perceptually motivated pre-filtering according to some embodiments. In FIG. 7, a set of DCT blocks 420 is obtained, e.g., as discussed in reference to FIG. 5. In certain embodiments, FIG. 7 illustrates the main filtering step of the PMPF.

In certain embodiments, the following example steps (shown as circled number in FIG. 7) are used to filter the current block (CBF):

Step 1: Preparation Step: group the current block (CBF) and its (e.g., seven) spatiotemporal representations into a 3D array. For example, preparing a 3D array 420 of dimensions W×H×Number of Representations (e.g., CBF, spatial, and temporal representations) (e.g., shown as W=8, H=8 and NumRep=8 (e.g., as shown in FIG. 4).

Step 2: Gather the 8×8 Perceptual Thresholds (e.g., as discussed above).

Step 3: Restack the 3D Array into a 2D array of a plurality of (e.g., 64) 1D vectors, (e.g., with example dimensions as follows: 64×NumRep) with each 1D vector consisting of DCT coefficients located at the same spatial position, e.g., group all DCT coefficients from different representations (e.g., frames) located in same position into a same 1D vector.

Step 4: Replicate and Scale at 704: each threshold coefficient will be scaled (e.g., where the wavelet transform separates low, middle, and high frequencies, the thresholds are scaled (e.g., according to order-of-magnitude, accordingly) to generate thresholds 706. In certain embodiments, the replication (e.g., replicating (and scaling) of coefficient 702 into vector 706, etc.) ensures that all coefficients at the same spatial position are filtered based on the same threshold.

Step 5: Forward wavelet transform (e.g., Haar-1D 3 level decomposition), e.g., where the value in the first element in the output vector is based (e.g., is the average) on all elements in a 1D input vector, the value in the second element in the output vector is based (e.g., is the average) on the first proper subset (e.g., first four) elements in that 1D input vector, the value in the third element in the output vector is based (e.g., is the average) on the second proper subset (e.g., last four) elements in that 1D input vector, etc.

Step 6: Adaptive Soft Thresholding. Adaptively thresholds each 1D vector of coefficients to mute/attenuate coefficients beyond thresholds 706. In certain embodiments, depending on the block type (e.g., spatial or temporal), a different thresholding technique is used. For example, for a block detected as plain or smooth textured the "non-negative Garrote" thresholding technique is used in certain embodiments. For the remaining block types, the "soft thresholding" thresholding technique is used in certain embodiments. For example, where the coarseness of the wavelet transform (e.g., Haar-1D 3 level decomposition) of the mid and low frequencies motivates the selection of this adaptive thresholding technique, e.g., where a hard thresholding technique will create discontinuities around/near thresholds values. In certain embodiments, the representations of a current block are motion compensated blocks indicating existence of dissimilarity, e.g., where if a hard thresholding technique is used, artifacts will be visible.

In certain embodiments, a soft thresholding technique mutes the all the wavelet coefficients with absolute value below the thresholds. An example soft thresholding function is defined as follows:

$$\eta(x, \lambda) = \begin{cases} x - \lambda \text{ if } |x| > \lambda \\ x + \lambda \text{ if } |x| < -\lambda \\ 0 \text{ if } |x| \le \lambda \end{cases} \quad (2)$$

Step 7: Reconstruction: reconstruct the stack using the inverse (e.g., Haar-1D) wavelet transform.

Step 8: De-Stack: Reshape the stack of reconstructed coefficients back to DCT 2D shape (e.g., blocks 426). An inverse DCT transform may then be performed on the DCT blocks 426, e.g., to generate respective pixel blocks which may then be used (e.g., aggregated) to form a final block (e.g., frame) for encoding.

Reconstruction and Aggregation

In certain embodiments, the output of the perceptual wavelet shrinkage is a 3D array of DCT coefficients (e.g., 3D array 426 in FIG. 7) representing different spatial/temporal frames. In certain embodiments, an inverse DCT will be applied to reconstruct the filtered pixel blocks.

In order to implement the full collaborative idea, in certain embodiments, blocks belonging to a different temporal frame will be stored in their position in their respective frames using the reciprocal motion vector technique (for example, where motion compensation moves the block in the temporal frame, e.g., after the filtering process stores the filtered block in original position). Once all filtering is done, the final frame is obtained through aggregation of all filtered blocks in certain embodiments. In one embodiment, a block belonging to a frame with display (e.g., temporal) order of 4 (e.g., "frame 4") will aggregate the following blocks: blocks filtered according to 2 (being the Ref+2 of Frame 2), according to 3, according to 4(Current), according to 5(Ref+1), and according to 6.

In certain embodiments, it is desired to avoid a reciprocal motion vector, and thus the aggregation reconstructs a proper subset of filtered DCT blocks belonging only to the current frame, e.g., only the CBF and spatial blocks, but not the temporal blocks.

For example, where each block to be filtered at position (x, y) will generate 4 filtered blocks with the following spatial indexes:

(x+0,y+0)
(x+0,y+4)
(x+4,y+0)
(x+4,y+4)

Figure 8:
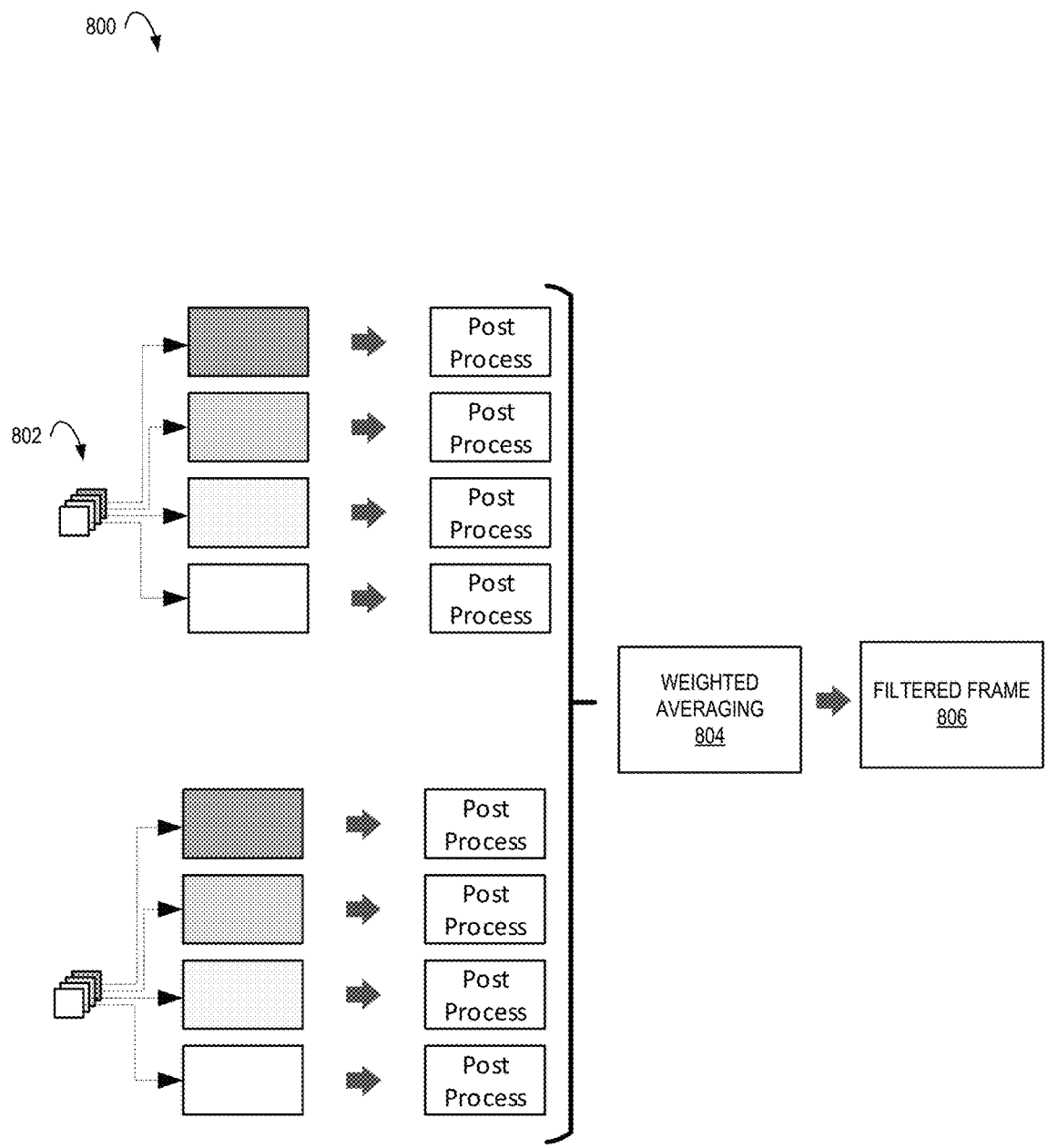
FIG. 8 is a flow diagram illustrating final frame aggregation in a method for perceptually motivated pre-filtering according to some embodiments.

FIG. 8 is a flow 800 diagram illustrating final frame aggregation in a method for perceptually motivated pre-filtering according to some embodiments. Examples of post processing are discussed below.

With an overlap of 4 pixels, and using reconstruction of only spatial blocks (e.g., positions), a plurality (e.g., four or sixteen) filtered frames 802 will be generated. In one embodiment, weighted averaging at 804 is used to aggregate the plurality of frames to obtain the final filtered frame (e.g., image). In another embodiment, averaging is used where the final filtered frame 806 (e.g., image) is the average of all filtered frames. Final filtered frame 806 may then be encoded, e.g., and similarly for each additional filtered frame.

Post Processing

To overcome potential blocking artifacts that could be caused by the filtering in a DCT domain, a post processing stage is applied in certain embodiments. For example, performing post processing on each of the individual filtered frames 802 before aggregation or on the final aggregated frame 806. Post processing may be applying a post sharpening filter to generate a crisper looking image.

In one embodiment, an enhancement filter is applied downstream on the final aggregated frame (e.g., image).

Luminance and Chroma Considerations

The above may be applied on a luma component of a set of color space components, but it should be understood that the disclosure herein is applicable to other components of the set of color space components (e.g., chrominance components, such as, but not limited to, blue chrominance and red chrominance).

For example, "YUV" is a color space (e.g., color encoding scheme) that may be used as part of a color image pipeline. In certain embodiments, the selected color space encodes a color image or video taking human perception into account, allowing reduced bandwidth for chrominance components, and generally enabling transmission errors or compression artifacts to be more efficiently masked by the human perception than using a "direct" red green blue (RGB) representation. A color space may encode brightness information (e.g., luma component Y) separately from color information (e.g., chrominance components U and V). YUV may be used as a general term encompassing (i) YUV-analog phase alternating line (PAL) encoding, (ii) YIQ-analog national television system committee (NTSC) encoding, and (iii) YCbCr-digital encoding.

Original black and white TV was broadcast by transmitting an analog signal representing just the luminance of the image. When color was introduced into television, the black and white luma system was not just thrown away. Chrominance (or color) information (e.g., designated as U and V) was added separately via a sub-carrier so that a black-and-white receiver would still be able to receive and display a color picture transmission in the receiver's native black-and-white format. In certain embodiments, U and V components provide color information and are color difference signals of blue minus luma (e.g., B−Y) and red minus luma (e.g., R−Y).

Y prime (Y') generally refers to a gamma compressed luminance Y (e.g., Y' being referred to as the "luma" component) (the brightness) and U and V are the chrominance (color) components, e.g., with "luminance" Y referring to physical linear-space brightness, while "luma" Y' referring to (e.g., non-linear) perceptual brightness.

In certain embodiments, a YPbPr color space is used in analog component video and its digital version YCbCr is used in digital video, e.g., where Cb/Pb and Cr/Pr are deviations from grey on blue-yellow and red-cyan axes, respectively, whereas U and V are blue-luminance and red-luminance differences, respectively.

A video encoder herein may operate according to a video encoding standard. In one embodiment, the video encoding standard is an Advanced Video Coding (AVC) standard, for example, a H.264 standard or a H.265 standard.

In one embodiment, using soft thresholding techniques when spatially processing chroma is desirable.

Interlace, Higher Bit Depths, and High-Dynamic-Range (HDR) Considerations

In certain embodiments, the pixel values are a same bit depth, e.g., 8 bits or 10 bits. In one embodiment, scaling from one bit depth (e.g., 10 bits) to a different bit depth (e.g., 8 bits) is performed at the DCT level, e.g., there is no extra algorithmic change to support higher bit depth.

For interlaced video support the availability of extra reference points (e.g., same frame, but different field reference, e.g., where one field is the odd lines of an interlaced frame and a second, different field is the even line of the interlaced frame) could be a potential advantage for the collaborative where the stack could be a pure temporal one (e.g., as the ideal case).

Embodiments herein use JND as the thresholding technique (e.g., model). Embodiments herein perform model tuning for encoding applications, e.g., where a perceptual model does not consider information loss that will happen when the pixels are encoded, embodiments herein embed the modeling of an encoder downstream. Embodiments herein allow for selection of a computationally reasonable yet performant, modular and multiplicative model, e.g., where the model can be augmented with new visual aspects. Embodiments herein use a filtering technique that includes an adaptive soft thresholding technique in wavelet domain, e.g., block class based adaptive filtering. Embodiments herein allow for reduced computation, e.g., by allowing for algorithmic decisions that lead to extremely fast implementation. Embodiments herein provide a filter architecture that allows a choice of overlap size and/or utilizes a 3D DCT array. Embodiments herein allow for failsafe design model parameter selection.

Figure 9:
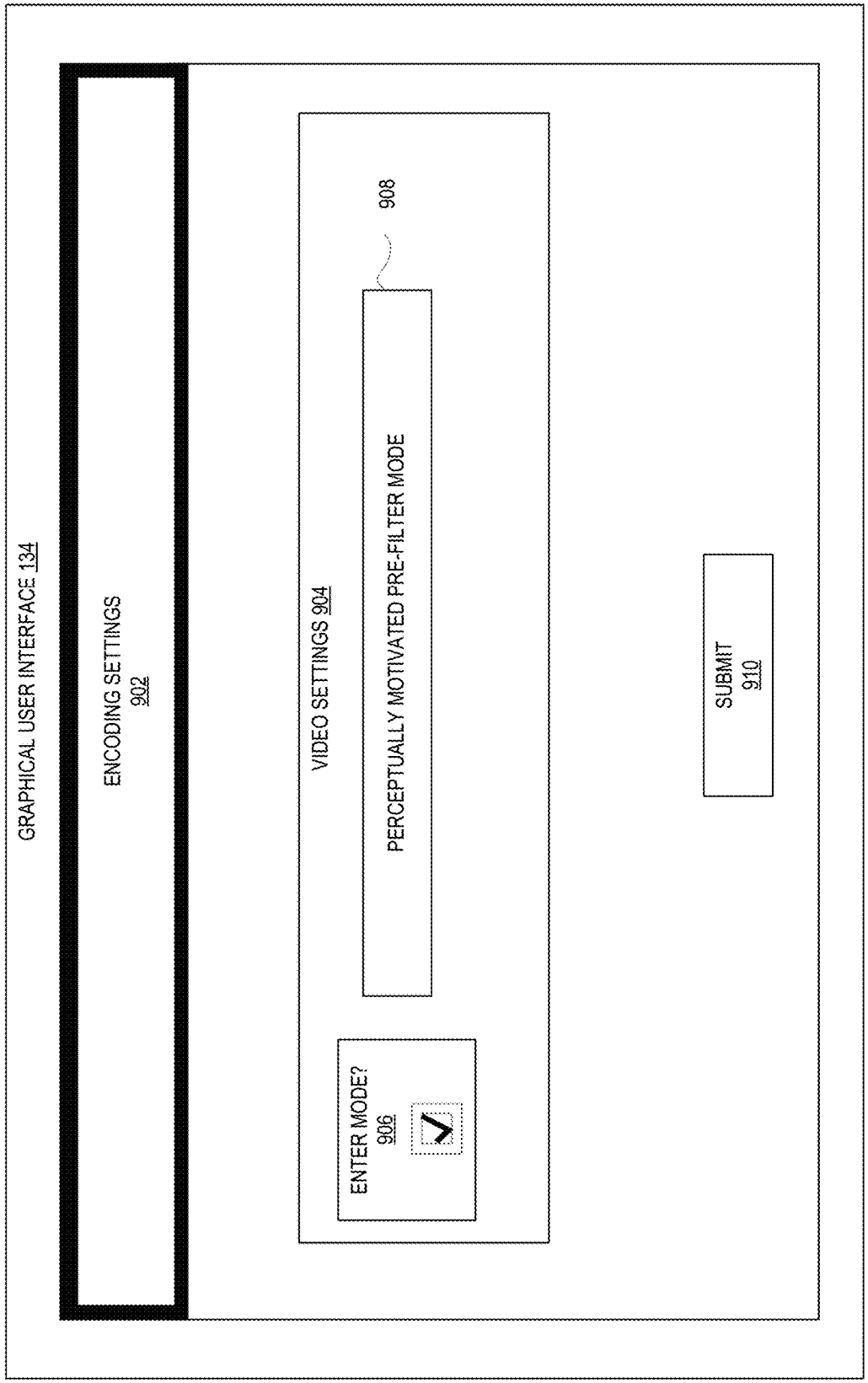
FIG. 9 is a diagram illustrating a graphical user interface for setting a content delivery system/service into a perceptually motivated pre-filter mode according to some embodiments.

FIG. 9 is a diagram illustrating a graphical user interface for setting a content delivery system/service into a perceptually motivated pre-filter mode according to some embodiments. Depicted graphical user interface 134 includes a field 902 that is customizable with text to indicate that these are encoding settings, a field 904 that is customizable with text to indicate that these are video settings, an interface element 906 that, when selected, will cause the content delivery system/service to enter a perceptually motivated pre-filter mode, and a field 908 that is customizable with text to indicate that selecting the interface element 906 is to cause perceptually motivated pre-filtering. A user may click the submit interface element 910 to (e.g., cause a command to be sent that causes) entry of a content delivery system/service into a perceptually motivated pre-filter mode (e.g., mode 114 in FIG. 1). An interface element, may include, but is not limited to, a thumbs up (or down), checkbox, button, dropdown menu, etc.

Figure 10:
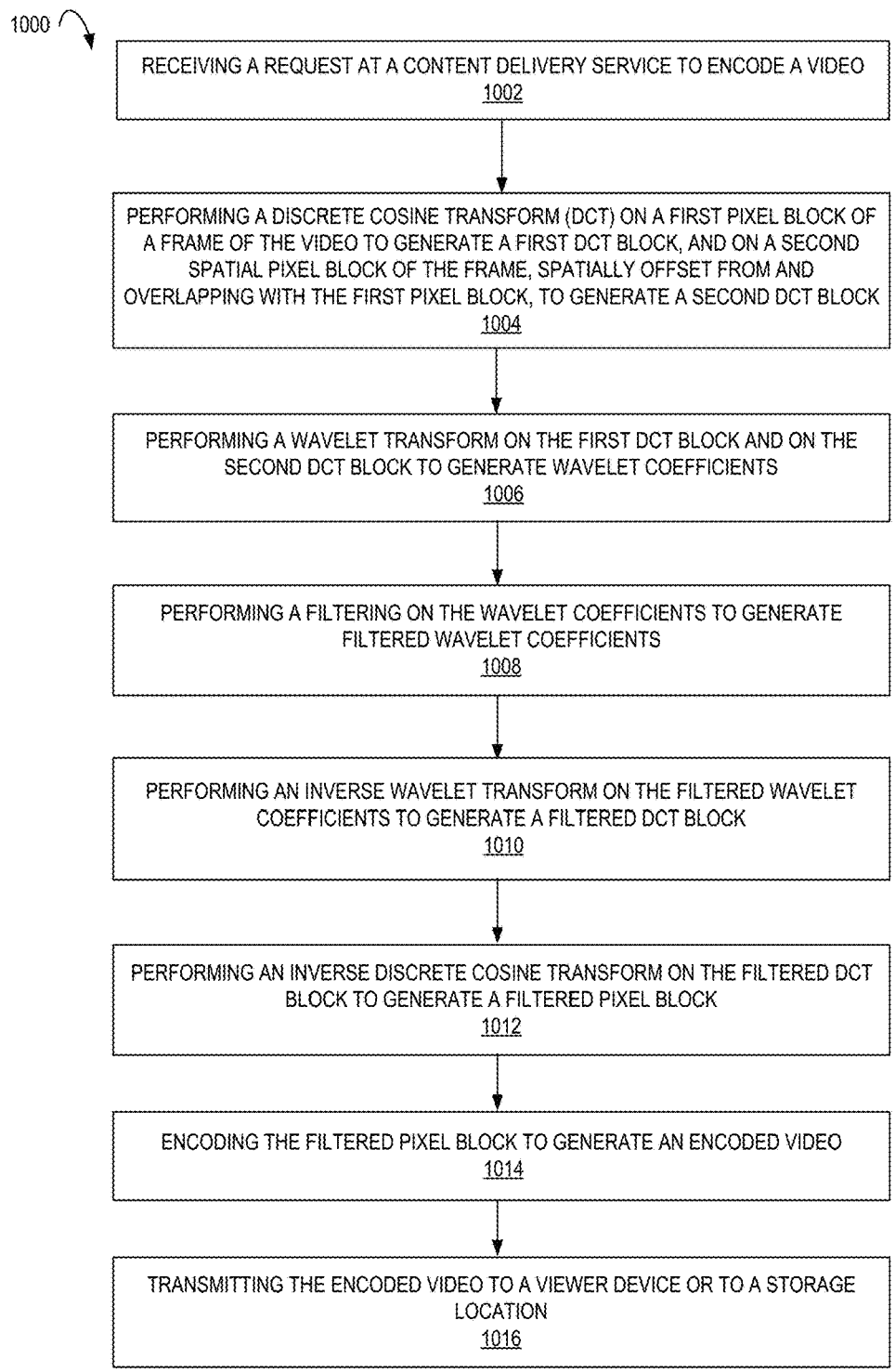
FIG. 10 is a flow diagram illustrating operations of a method for perceptually motivated pre-filtering according to some embodiments.

FIG. 10 is a flow diagram illustrating operations 1000 of a method for perceptually motivated pre-filtering according to some embodiments. Some or all of the operations 1000 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1000 are performed by content delivery system/service (or a component thereof) of the other figures.

The operations 1000 include, at block 1002, receiving a request at a content delivery service to encode a video. The operations 1000 further include, at block 1004, performing a discrete cosine transform (DCT) on a first pixel block of a frame of the video to generate a first DCT block, and on a second spatial pixel block of the frame, spatially offset from and overlapping with the first pixel block, to generate a second DCT block. The operations 1000 further include, at block 1006, performing a wavelet transform on the first DCT block and on the second DCT block to generate wavelet coefficients. The operations 1000 further include, at block 1008, performing a filtering on the wavelet coefficients to generate filtered wavelet coefficients. The operations 1000 further include, at block 1010, performing an inverse wavelet transform on the filtered wavelet coefficients to generate a filtered DCT block. The operations 1000 further include, at block 1012, performing an inverse discrete cosine transform on the filtered DCT block to generate a filtered pixel block. The operations 1000 further include, at block 1014, encoding the filtered pixel block to generate an encoded video. The operations 1000 further include, at block 1016, transmitting the encoded video to a viewer device or to a storage location.

Figure 11:
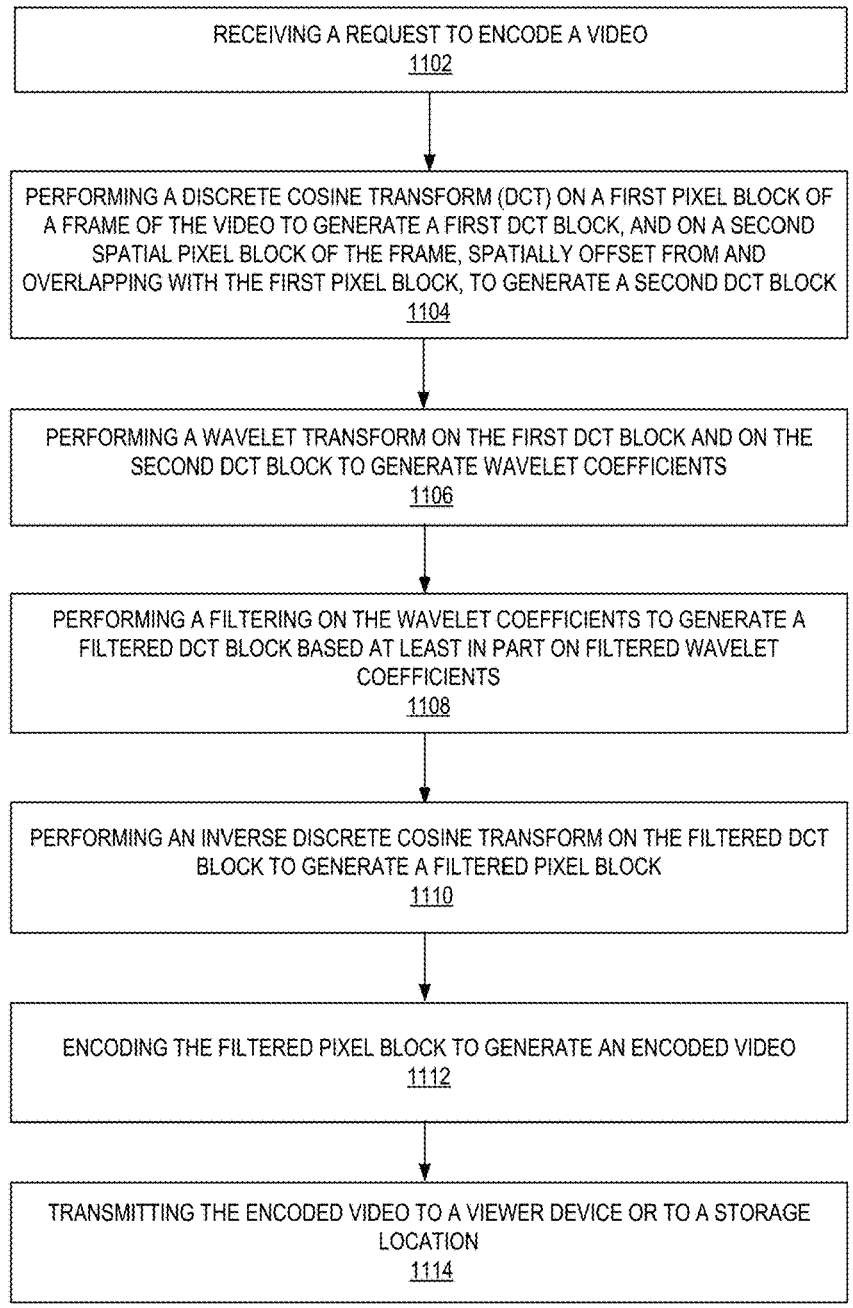
FIG. 11 is a flow diagram illustrating operations of a method for perceptually motivated pre-filtering according to some embodiments.

FIG. 11 is a flow diagram illustrating operations 1100 of a method for perceptually motivated pre-filtering according to some embodiments. Some or all of the operations 1100 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1100 are performed by content delivery system/service (or a component thereof) of the other figures.

The operations 1100 include, at block 1102, receiving a request to encode a video. The operations 1100 further include, at block 1104, performing a discrete cosine transform (DCT) on a first pixel block of a frame of the video to generate a first DCT block, and on a second spatial pixel block of the frame, spatially offset from and overlapping with the first pixel block, to generate a second DCT block. The operations 1100 further include, at block 1106, performing a wavelet transform on the first DCT block and on the second DCT block to generate wavelet coefficients. The operations 1100 further include, at block 1108, performing a filtering on the wavelet coefficients to generate a filtered DCT block based at least in part on filtered wavelet coefficients. The operations 1100 further include, at block 1110, performing an inverse discrete cosine transform on the filtered DCT block to generate a filtered pixel block. The operations 1100 further include, at block 1112, encoding the filtered pixel block to generate an encoded video. The operations 1100 further include, at block 1114, transmitting the encoded video to a viewer device or to a storage location.

Exemplary environments, systems, etc. that the above may be used in are detailed below.

Figure 12:
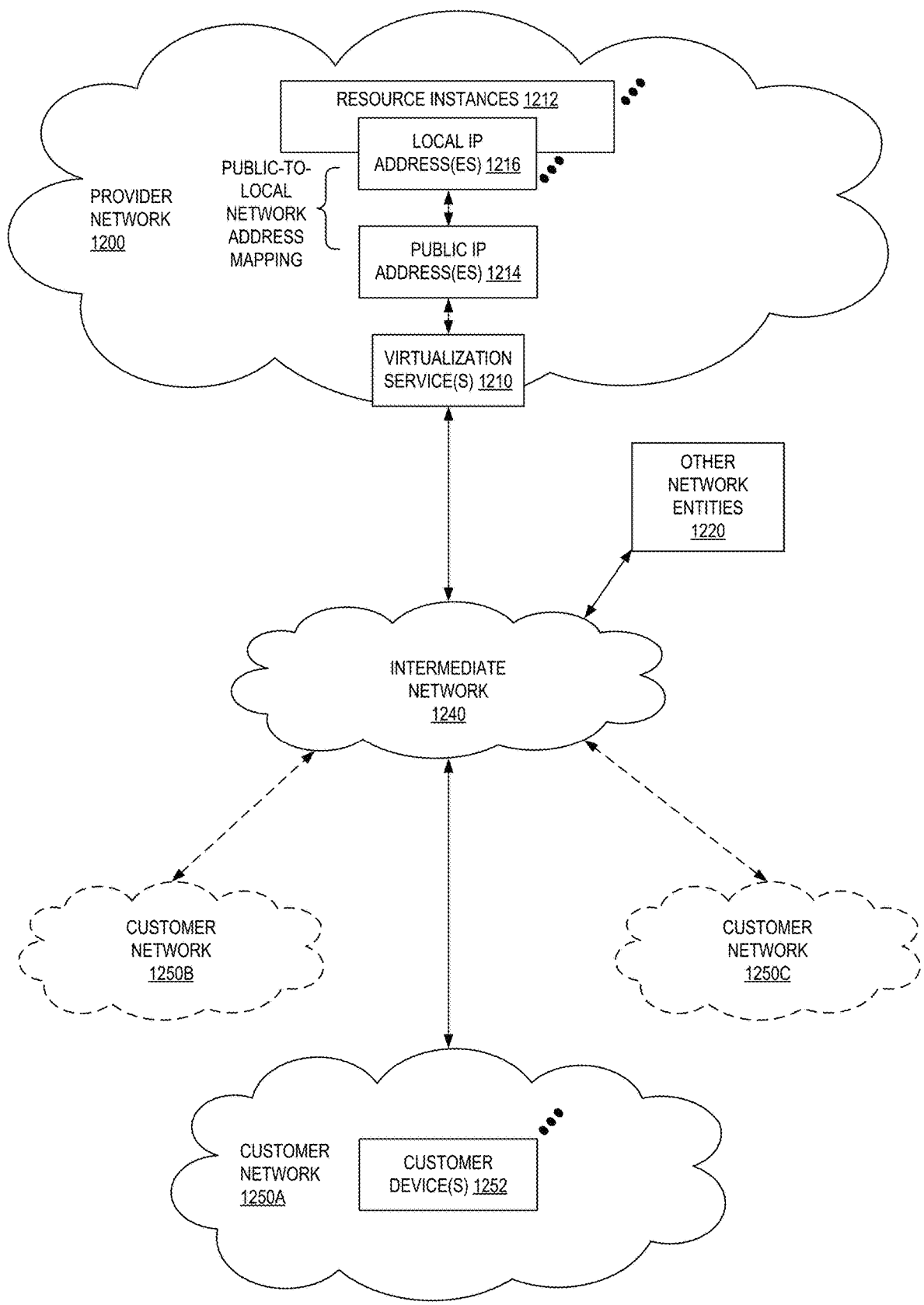
FIG. 12 illustrates an example provider network environment according to some embodiments.

FIG. 12 illustrates an example provider network (or "service provider system") environment according to some embodiments. A provider network 1200 may provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 may be associated with the resource instances 1212; the local IP addresses are the internal network addresses of the resource instances 1212 on the provider network 1200. In some embodiments, the provider network 1200 may also provide public IP addresses 1214 and/or public IP address ranges (e.g., Internet Protocol version 4 (IPv4) or Internet Protocol version 6 (IPv6) addresses) that customers may obtain from the provider 1200.

Conventionally, the provider network 1200, via the virtualization services 1210, may allow a customer of the service provider (e.g., a customer that operates one or more client networks 1250A-1250C including one or more customer device(s) 1252) to dynamically associate at least some public IP addresses 1214 assigned or allocated to the customer with particular resource instances 1212 assigned to the customer. The provider network 1200 may also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of customer network(s) 1250A-1250C may, for example, implement customer-specific applications and present the customer's applications on an intermediate network 1240, such as the Internet. Other network entities 1220 on the intermediate network 1240 may then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 may be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1200; a customer may then assign their allocated public IP addresses to particular resource instances allocated to the customer. These public IP addresses may be referred to as customer public IP addresses, or simply customer IP addresses. Instead of being assigned by the provider network 1200 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
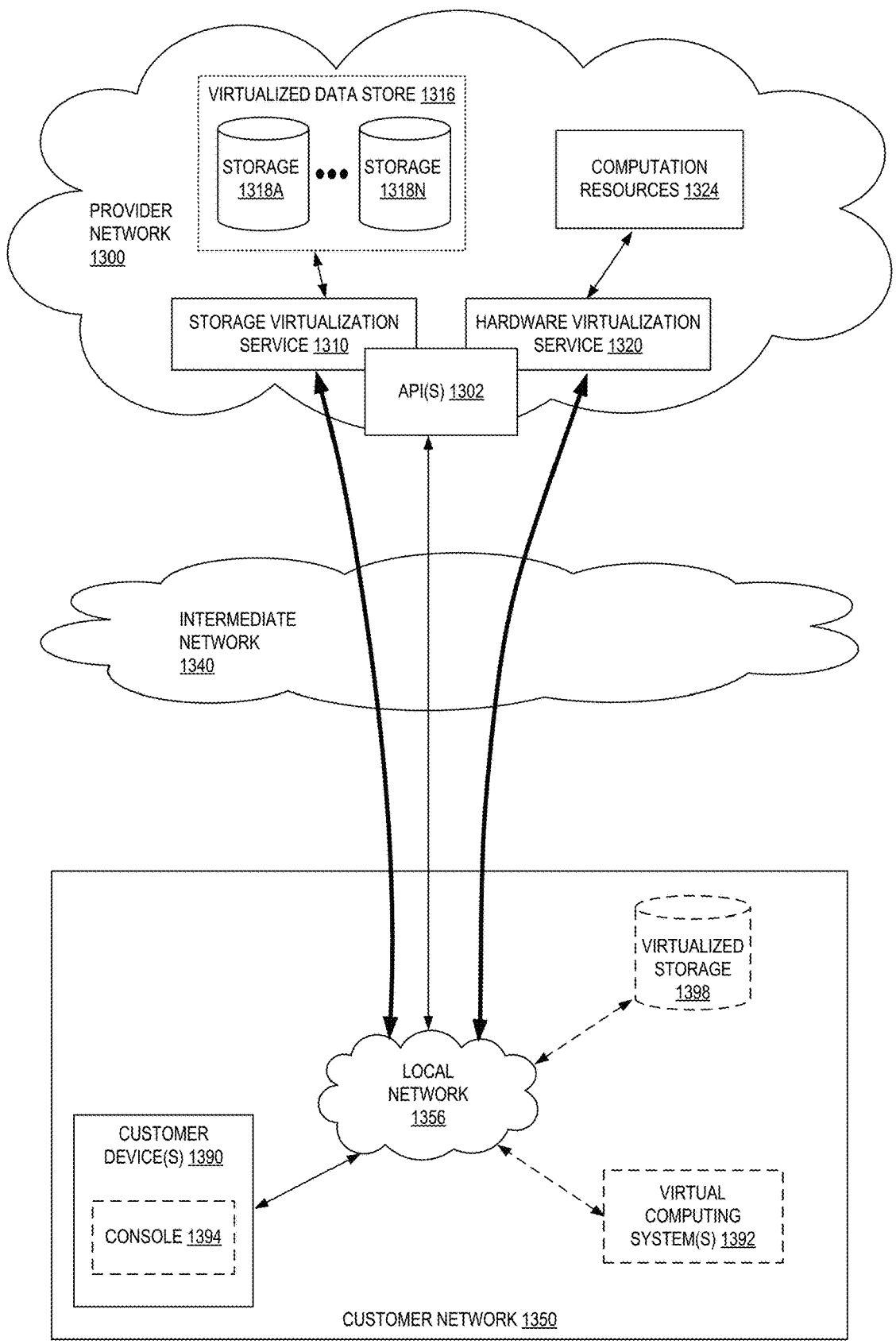
FIG. 13 is a block diagram of an example provider network that provides a storage service and a hardware virtualization service to customers according to some embodiments.

FIG. 13 is a block diagram of an example provider network that provides a storage service and a hardware virtualization service to customers, according to some embodiments. Hardware virtualization service 1320 provides multiple computation resources 1324 (e.g., VMs) to customers. The computation resources 1324 may, for example, be rented or leased to customers of the provider network 1300 (e.g., to a customer that implements customer network 1350). Each computation resource 1324 may be provided with one or more local IP addresses. Provider network 1300 may be configured to route packets from the local IP addresses of the computation resources 1324 to public Internet destinations, and from public Internet sources to the local IP addresses of computation resources 1324.

Provider network 1300 may provide a customer network 1350, for example coupled to intermediate network 1340 via local network 1356, the ability to implement virtual computing systems 1392 via hardware virtualization service 1320 coupled to intermediate network 1340 and to provider network 1300. In some embodiments, hardware virtualization service 1320 may provide one or more APIs 1302, for example a web services interface, via which a customer network 1350 may access functionality provided by the hardware virtualization service 1320, for example via a console 1394 (e.g., a web-based application, standalone application, mobile application, etc.). In some embodiments, at the provider network 1300, each virtual computing system 1392 at customer network 1350 may correspond to a computation resource 1324 that is leased, rented, or otherwise provided to customer network 1350.

From an instance of a virtual computing system 1392 and/or another customer device 1390 (e.g., via console 1394), the customer may access the functionality of storage service 1310, for example via one or more APIs 1302, to access data from and store data to storage resources 1318A-1318N of a virtual data store 1316 (e.g., a folder or "bucket", a virtualized volume, a database, etc.) provided by the provider network 1300. In some embodiments, a virtualized data store gateway (not shown) may be provided at the customer network 1350 that may locally cache at least some data, for example frequently accessed or critical data, and that may communicate with storage service 1310 via one or more communications channels to upload new or modified data from a local cache so that the primary store of data (virtualized data store 1316) is maintained. In some embodiments, a user, via a virtual computing system 1392 and/or on another customer device 1390, may mount and access virtual data store 1316 volumes via storage service 1310 acting as a storage virtualization service, and these volumes may appear to the user as local (virtualized) storage 1398.

While not shown in FIG. 13, the virtualization service(s) may also be accessed from resource instances within the provider network 1300 via API(s) 1302. For example, a customer, appliance service provider, or other entity may access a virtualization service from within a respective virtual network on the provider network 1300 via an API 1302 to request allocation of one or more resource instances within the virtual network or within another virtual network.

Illustrative System

Figure 14:
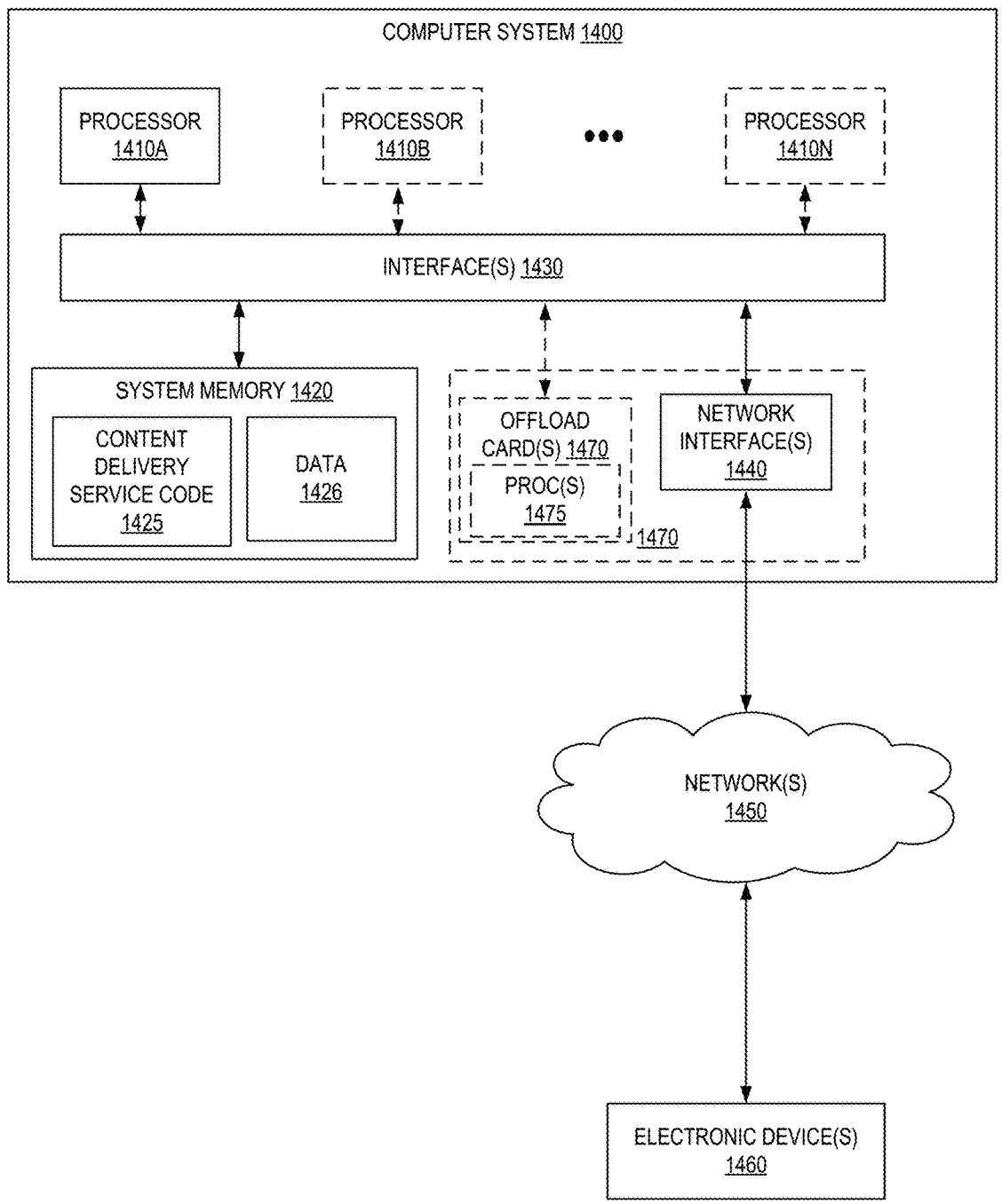
FIG. 14 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 1400 illustrated in FIG. 14. In the illustrated embodiment, computer system 1400 includes one or more processors 1410 coupled to a system memory 1420 via an input/output (I/O) interface 1430. Computer system 1400 further includes a network interface 1440 coupled to I/O interface 1430. While FIG. 14 shows computer system 1400 as a single computing device, in various embodiments a computer system 1400 may include one computing device or any number of computing devices configured to work together as a single computer system 1400.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1410 may commonly, but not necessarily, implement the same ISA.

System memory 1420 may store instructions and data accessible by processor(s) 1410. In various embodiments, system memory 1420 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1420 as content delivery service code 1425 (e.g., executable to implement, in whole or in part, the content delivery service 1024) and data 1426.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing, or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1450, such as other computer systems or devices as illustrated in FIG. 1, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1400 includes one or more offload cards 1470 (including one or more processors 1475, and possibly including the one or more network interfaces 1440) that are connected using an I/O interface 1430 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1400 may act as a host electronic device (e.g., operating as part of a hardware virtualization service) that hosts compute instances, and the one or more offload cards 1470 execute a virtualization manager that can manage compute instances that execute on the host electronic device. As an example, in some embodiments the offload card(s) 1470 can perform compute instance management operations such as pausing and/or un-pausing compute instances, launching and/or terminating compute instances, performing memory transfer/copying operations, etc. These management operations may, in some embodiments, be performed by the offload card(s) 1470 in coordination with a hypervisor (e.g., upon a request from a hypervisor) that is executed by the other processors 1410A-1410N of the computer system 1400. However, in some embodiments the virtualization manager implemented by the offload card(s) 1470 can accommodate requests from other entities (e.g., from compute instances themselves), and may not coordinate with (or service) any separate hypervisor.

In some embodiments, system memory 1420 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Figure 15:
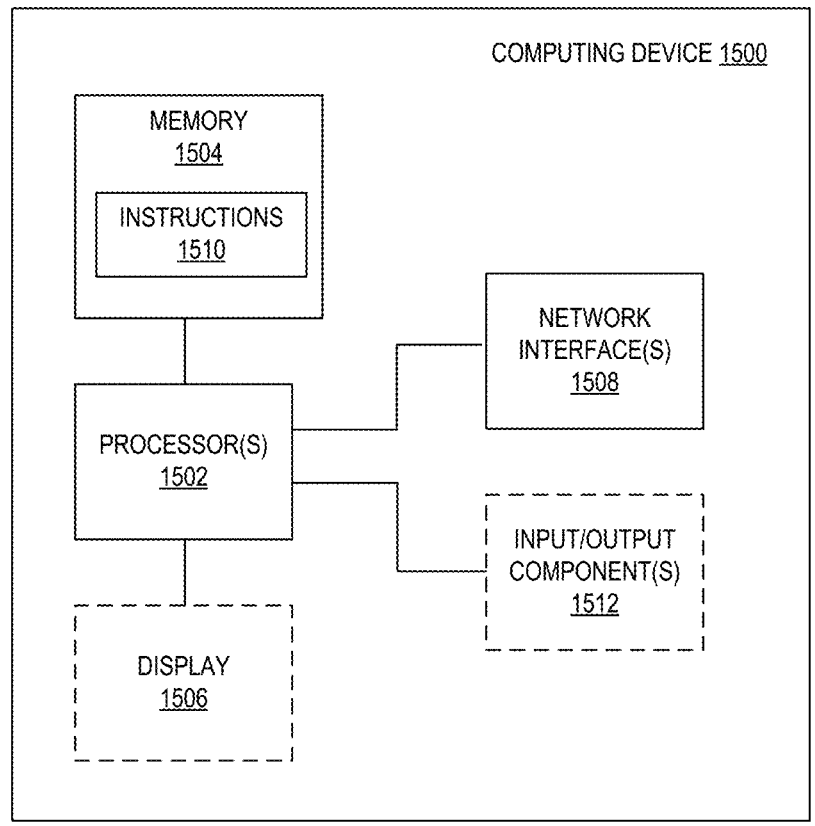
FIG. 15 illustrates a logical arrangement of a set of general components of an exemplary computing device that can be utilized in accordance with various embodiments.

FIG. 15 illustrates a logical arrangement of a set of general components of an example computing device 1500. Generally, a computing device 1500 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1502 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1504) to store code (for example, instructions 1510, e.g., which implement a content delivery service as disclosed herein), and a set of one or more wired or wireless network interfaces 1508 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1504) of a given electronic device typically stores code (e.g., instructions 1510) for execution on the set of one or more processors 1502 of that electronic device. One or more parts of various embodiments may be implemented using different combinations of software, firmware, and/or hardware.

A computing device 1500 can include some type of display element 1506, such as a touch screen or liquid crystal display (LCD), although many devices such as portable media players might convey information via other means, such as through audio speakers, and other types of devices such as server end stations may not have a display element 1506 at all. As discussed, some computing devices used in some embodiments include at least one input and/or output component(s) 1512 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 16:
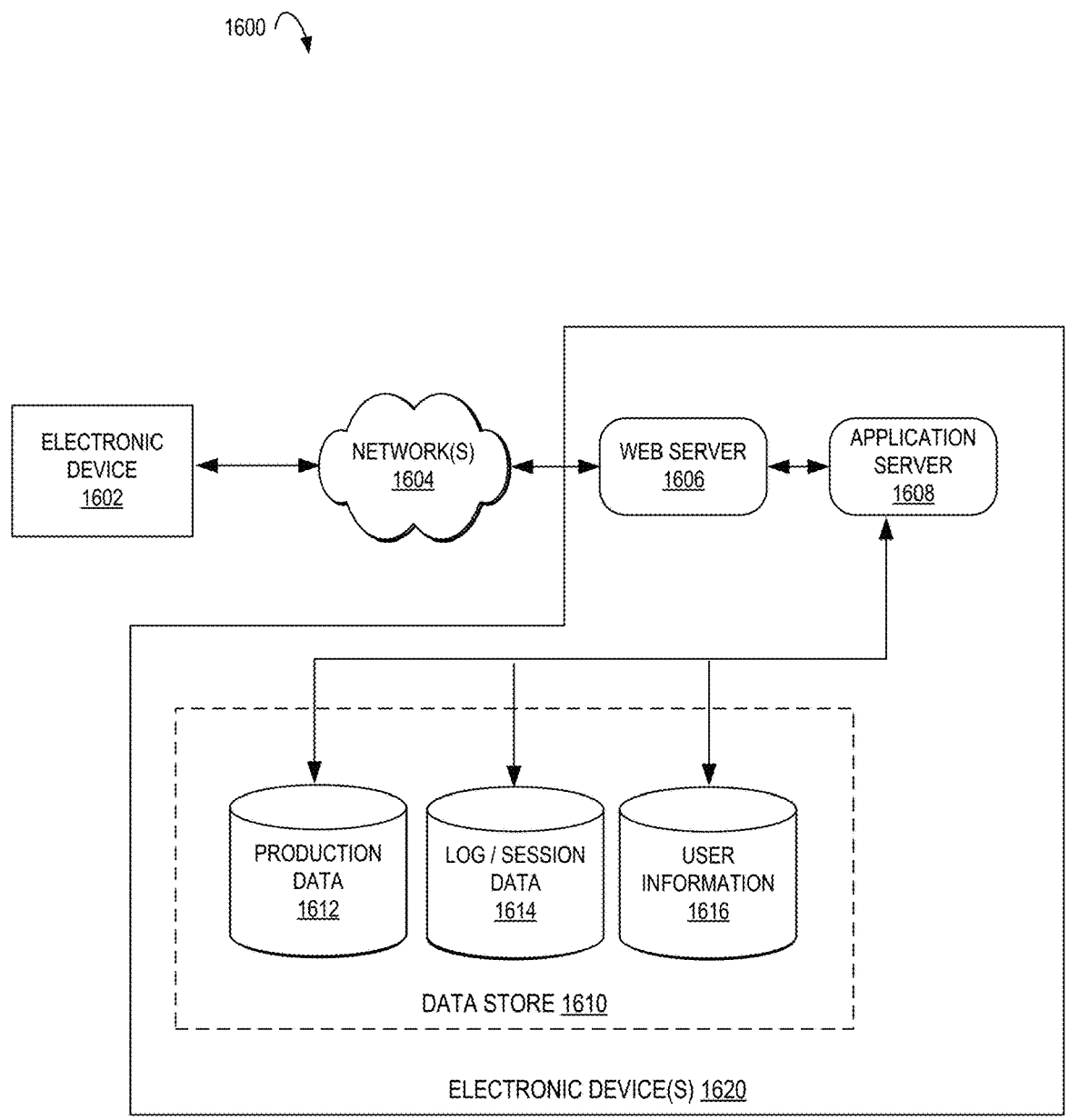
FIG. 16 illustrates an example of an environment for implementing aspects in accordance with various embodiments.

As discussed, different approaches can be implemented in various environments in accordance with the described embodiments. For example, FIG. 16 illustrates an example of an environment 1600 for implementing aspects in accordance with various embodiments. For example, in some embodiments messages are HyperText Transfer Protocol (HTTP) requests that are received by a web server (e.g., web server 1606), and the users, via electronic devices, may interact with the provider network via a web portal provided via the web server 1606 and application server 1608. As will be appreciated, although a web-based environment is used for purposes of explanation, different environments may be used, as appropriate, to implement various embodiments. The system includes an electronic client device 1602, which may also be referred to as a client device and can be any appropriate device operable to send and receive requests, messages, or information over an appropriate network 1604 and convey information back to a user of the device 1602. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1604 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1604 includes the Internet, as the environment includes a web server 1606 for receiving requests and serving content in response thereto, although for other networks an alternative device serving a similar purpose could be used, as would be apparent to one of ordinary skill in the art.

The illustrative environment includes at least one application server 1608 and a data store 1610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed, or clustered environment. The application server 1608 can include any appropriate hardware and software for integrating with the data store 1610 as needed to execute aspects of one or more applications for the client device 1602 and handling a majority of the data access and business logic for an application. The application server 1608 provides access control services in cooperation with the data store 1610 and is able to generate content such as text, graphics, audio, video, etc., to be transferred to the client device 1602, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1602 and the application server 1608, can be handled by the web server 1606. It should be understood that the web server 1606 and application server 1608 are not required and are merely example components, as structured code discussed herein can be executed on any appropriate device or host machine as discussed elsewhere herein.

The data store 1610 can include several separate data tables, databases, or other data storage mechanisms and media for storing data relating to a particular aspect. For example, the data store illustrated includes mechanisms for storing production data 1612 and user information 1616, which can be used to serve content for the production side. The data store 1610 also is shown to include a mechanism for storing log or session data 1614. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update, or otherwise process data in response thereto. In one example, a user might submit a search request for a certain type of item. In this case, the data store 1610 might access the user information 1616 to verify the identity of the user and can access a production data 1612 to obtain information about items of that type. The information can then be returned to the user, such as in a listing of results on a web page that the user is able to view via a browser on the user device 1602. Information for a particular item of interest can be viewed in a dedicated page or window of the browser.

The web server 1606, application server 1608, and/or data store 1610 may be implemented by one or more electronic devices 1620, which can also be referred to as electronic server devices or server end stations, and may or may not be located in different geographic locations. Each of the one or more electronic devices 1620 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the environment 1600 in FIG. 16 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1318A-1318N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request at a content delivery service to encode a video;
   performing a discrete cosine transform (DCT) on a first pixel block of a frame of the video to generate a first DCT block, and on a second spatial pixel block of the frame, spatially offset from and overlapping with the first pixel block, to generate a second DCT block;
   restacking the first DCT block and the second DCT block into respective vectors of DCT coefficients for each same spatial position in the first DCT block and the second DCT block;
   performing a wavelet transform on the respective vectors of DCT coefficients to generate wavelet coefficients;
   performing a filtering on the wavelet coefficients to generate filtered wavelet coefficients;
   performing an inverse wavelet transform on the filtered wavelet coefficients to generate a filtered DCT block;
   performing an inverse discrete cosine transform on the filtered DCT block to generate a filtered pixel block;
   encoding the filtered pixel block to generate an encoded video; and
   transmitting the encoded video to a viewer device or to a storage location.

2. The computer-implemented method of claim 1, further comprising performing a discrete cosine transform on a third temporal pixel block, offset by at least one frame from the frame of the video, to generate a third DCT block, wherein the restacking is of the first DCT block, the second DCT block, and the third DCT block into the respective vectors of DCT coefficients for each same spatial position in the first DCT block, the second DCT block, and the third DCT block.

3. The computer-implemented method of claim 1, wherein the performing the filtering comprises performing thresholding on the wavelet coefficients based at least in part on perceptual thresholds to generate the filtered DCT block.

4. The computer-implemented method of claim 1, wherein the performing the wavelet transform is on each respective vector to generate a corresponding vector of the wavelet coefficients.

5. A computer-implemented method comprising:
   receiving a request to encode a video;
   performing a discrete cosine transform (DCT) on a first pixel block of a frame of the video to generate a first DCT block, and on a second spatial pixel block of the frame, spatially offset from and overlapping with the first pixel block, to generate a second DCT block;
   restacking the first DCT block and the second DCT block into respective vectors of DCT coefficients for each same spatial position in the first DCT block and the second DCT block;
   performing a wavelet transform on the respective vectors of DCT coefficients to generate wavelet coefficients;
   performing a filtering on the wavelet coefficients to generate a filtered DCT block based at least in part on filtered wavelet coefficients;
   performing an inverse discrete cosine transform on the filtered DCT block to generate a filtered pixel block;
   encoding the filtered pixel block to generate an encoded video; and
   transmitting the encoded video to a viewer device or to a storage location.

6. The computer-implemented method of claim 5, further comprising performing a discrete cosine transform on a third temporal pixel block, offset by at least one frame from the frame of the video, to generate a third DCT block, wherein the restacking is of the first DCT block, the second DCT block, and the third DCT block into the respective vectors of DCT coefficients for each same spatial position in the first DCT block, the second DCT block, and the third DCT block.

7. The computer-implemented method of claim 6, wherein:
the performing the filtering on the wavelet coefficients generates a first filtered DCT block for the first DCT block, a second filtered DCT block for the second DCT block, and a third filtered DCT block for the third DCT block, and the performing the inverse discrete cosine transform generates a first filtered pixel block from the first filtered DCT block, a second filtered pixel block from the second filtered DCT block, and a third filtered pixel block from the third filtered DCT block; and
further comprising combining the first filtered pixel block and the second filtered pixel block to generate the filtered pixel block.

8. The computer-implemented method of claim 7, wherein the combining the first filtered pixel block and the second filtered pixel block to generate the filtered pixel block does not include the third filtered pixel block.

9. The computer-implemented method of claim 5, wherein:
the performing the filtering on the wavelet coefficients generates a first filtered DCT block for the first DCT block and a second filtered DCT block for the second DCT block, and the performing the inverse discrete cosine transform generates a first filtered pixel block from the first filtered DCT block and a second filtered pixel block from the second filtered DCT block; and
further comprising combining the first filtered pixel block and the second filtered pixel block to generate the filtered pixel block.

10. The computer-implemented method of claim 5, wherein the performing the filtering comprises performing thresholding on the wavelet coefficients based at least in part on perceptual thresholds to generate the filtered DCT block.

11. The computer-implemented method of claim 10, further comprising determining a perceptual threshold for each pixel of the first pixel block and scaling those perceptual thresholds for each pixel of the second spatial pixel block based on their order of magnitude to generate the perceptual thresholds used to perform the thresholding.

12. The computer-implemented method of claim 5, further comprising performing a discrete cosine transform on a third spatial pixel block, spatially offset from and overlapping with the first pixel block and the second spatial pixel block, to generate a third DCT block, wherein the restacking is of the first DCT block, the second DCT block, and the third DCT block into the respective vectors of DCT coefficients for each same spatial position in the first DCT block, the second DCT block, and the third DCT block.

13. The computer-implemented method of claim 5, wherein the performing the wavelet transform is on each respective vector to generate a corresponding vector of the wavelet coefficients.

14. The computer-implemented method of claim 13, wherein the performing the filtering on the wavelet coefficients is on the corresponding vectors of the wavelet coefficients to generate corresponding filtered vectors of the wavelet coefficients, and the computer-implemented method further comprises:
performing an inverse wavelet transform on the filtered vectors of the wavelet coefficients to generate corresponding filtered DCT vectors; and
de-stacking the corresponding filtered DCT vectors to generate the filtered DCT block.

15. A system comprising:
a video intake service implemented by a first one or more electronic devices, the video intake service including instructions that upon execution cause the one or more electronic devices to intake a video; and
a content delivery service implemented by a second one or more electronic devices, the content delivery service including instructions that upon execution cause the one or more electronic devices to perform operations comprising:
receiving a request to encode the video,
performing a discrete cosine transform (DCT) on a first pixel block of a frame of the video to generate a first DCT block, and on a second spatial pixel block of the frame, spatially offset from and overlapping with the first pixel block, to generate a second DCT block,
restacking the first DCT block and the second DCT block into respective vectors of DCT coefficients for each same spatial position in the first DCT block and the second DCT block,
performing a wavelet transform on the respective vectors of DCT coefficients to generate wavelet coefficients,
performing a filtering on the wavelet coefficients to generate a filtered DCT block based at least in part on filtered wavelet coefficients,
performing an inverse discrete cosine transform on the filtered DCT block to generate a filtered pixel block,
encoding the filtered pixel block to generate an encoded video, and
transmitting the encoded video to a viewer device or to a storage location.

16. The system of claim 15, wherein the instructions upon execution cause the content delivery service to perform operations further comprising performing a discrete cosine transform on a third temporal pixel block, offset by at least one frame from the frame of the video, to generate a third DCT block, wherein the performing the wavelet transform is on the first DCT block, the second DCT block, and the third DCT block to generate the wavelet coefficients.

17. The system of claim 16, wherein the instructions upon execution cause the content delivery service to perform operations:
wherein the performing the filtering on the wavelet coefficients generates a first filtered DCT block for the first DCT block, a second filtered DCT block for the second DCT block, and a third filtered DCT block for the third DCT block, and the performing the inverse discrete cosine transform generates a first filtered pixel block from the first filtered DCT block, a second filtered pixel block from the second filtered DCT block, and a third filtered pixel block from the third filtered DCT block; and
further comprising combining the first filtered pixel block and the second filtered pixel block to generate the filtered pixel block.

18. The system of claim 15, wherein the instructions upon execution cause the content delivery service to perform operations wherein the performing the filtering comprises performing thresholding on the wavelet coefficients based at least in part on perceptual thresholds to generate the filtered DCT block.

19. The system of claim 15, wherein the instructions upon execution cause the content delivery service to perform operations further comprising performing a discrete cosine transform on a third spatial pixel block, spatially offset from and overlapping with the first pixel block and the second spatial pixel block, to generate a third DCT block, wherein the performing the wavelet transform is on the first DCT block, the second DCT block, and the third DCT block to generate the wavelet coefficients.

20. The system of claim 15, wherein the instructions upon execution cause the content delivery service to perform operations further comprising restacking the first DCT block and the second DCT block into respective vectors of DCT coefficients for each same spatial position in the first DCT block and the second DCT block, wherein the performing the wavelet transform is on the respective vectors to generate the wavelet coefficients, wherein the performing the wavelet transform is on each respective vector to generate a corresponding vector of the wavelet coefficients, and the performing the filtering on the wavelet coefficients is on the corresponding vectors of the wavelet coefficients to generate corresponding filtered vectors of the wavelet coefficients.

* * * * *